United States Patent [19]

Goldsworthy

[11] Patent Number: 4,462,946
[45] Date of Patent: Jul. 31, 1984

[54] APPARATUS AND METHOD FOR PRODUCING REINFORCED PLASTIC COMPOSITE ARTICLES OF NON-UNIFORM SHAPE AND NON-UNIFORM VOLUME

[75] Inventor: William B. Goldsworthy, Palos Verdes Estates, Calif.

[73] Assignee: Goldsworthy Engineering, Inc., Torrance, Calif.

[21] Appl. No.: 433,812

[22] Filed: Oct. 12, 1982

[51] Int. Cl.³ .................. B29C 17/14; D04H 3/07
[52] U.S. Cl. ......................... 264/23; 156/180; 156/441; 264/25; 264/149; 264/230; 264/257; 264/271.1; 264/297.5; 425/112; 425/113
[58] Field of Search ............... 156/180, 166, 441; 264/22, 271.1, 137, 257, 149, 23, 25, 230, 297.5; 425/112, 113

[56] References Cited

U.S. PATENT DOCUMENTS

| | | | |
|---|---|---|---|
| 2,745,164 | 5/1956 | Ros | 264/271.1 |
| 2,871,911 | 2/1959 | Goldsworthy et al. | 156/379.8 |
| 3,120,960 | 2/1964 | Pippert et al. | 264/137 |
| 3,303,243 | 2/1967 | Hughes et al. | 264/22 |
| 3,387,330 | 6/1968 | Lemelson | 425/112 |
| 3,447,794 | 6/1969 | Sudyk | 425/113 |
| 3,556,888 | 1/1971 | Goldsworthy | 156/180 |
| 3,650,864 | 3/1972 | Goldsworthy | 156/85 |
| 3,654,028 | 4/1972 | Goldsworthy | 156/171 |
| 3,740,285 | 6/1973 | Goldsworthy et al. | 156/173 |
| 3,769,127 | 10/1973 | Goldsworthy et al. | 156/173 |
| 3,864,183 | 2/1975 | Hori | 156/180 |
| 3,873,399 | 3/1975 | Goldsworthy et al. | 156/180 |
| 3,994,644 | 11/1976 | Hegler et al. | 425/112 |
| 4,024,001 | 5/1977 | Lyon et al. | 156/180 |
| 4,154,634 | 5/1979 | Shobert et al. | 156/441 |
| 4,296,060 | 10/1981 | Killmeyer et al. | 264/137 |
| 4,389,428 | 6/1983 | McDuffee et al. | 264/271.1 |

FOREIGN PATENT DOCUMENTS 42-7036838 12/1967 Japan .......................... 264/22

Primary Examiner—Jeffery Thurlow
Assistant Examiner—Patrick M. Dailey
Attorney, Agent, or Firm—Robert J. Schaap

[57] ABSTRACT

An apparatus and method for producing fiber reinforced plastic composite articles which have a length and where the shape of and volume of material in the composite across its length is not necessarily uniform. The apparatus receives filament containing reinforcing material, as for example, strands of filament reinforcing material impregnated with a hardenable binder such as a curable resin. The apparatus also includes a device for forming cores or plugs from a bulk-molding compound, roughly in the form of the desired shape of a portion of the article to be produced. Thereafter, the resin impregnated fiber containing reinforcing strands are disposed about each of the plugs which are draped over a continuous string to from a chain of the plugs on the string. The impregnated strands preferably enclose the plugs to form a composite therewith. Thereafter, a shrinkable film is wrapped about and encloses each of the strand encased plugs on the chain with the film sealed along its margins to completely enclose the plugs. Thereafter, the film is shrunk in a film shrunk tunnel. A suitable pre-curing device, e.g., a radio frequency generator initiates a cure of the curable resin binder impregnated in the strands. The fiber wrapped strand enclosed composite plugs are introduced into a final mold, containing a pair of split mold elements, which imparts the final shape to each of the articles to be produced. The final mold also applys a curing radiation to the film wrapped strand enclosed plugs to finally cure same to hardened reinforced plastic composite articles. A flash removal assembly provides for removal of excess material and thereafter, the shrinkable film is removed. The final articles are cut into the discrete composite articles.

67 Claims, 26 Drawing Figures

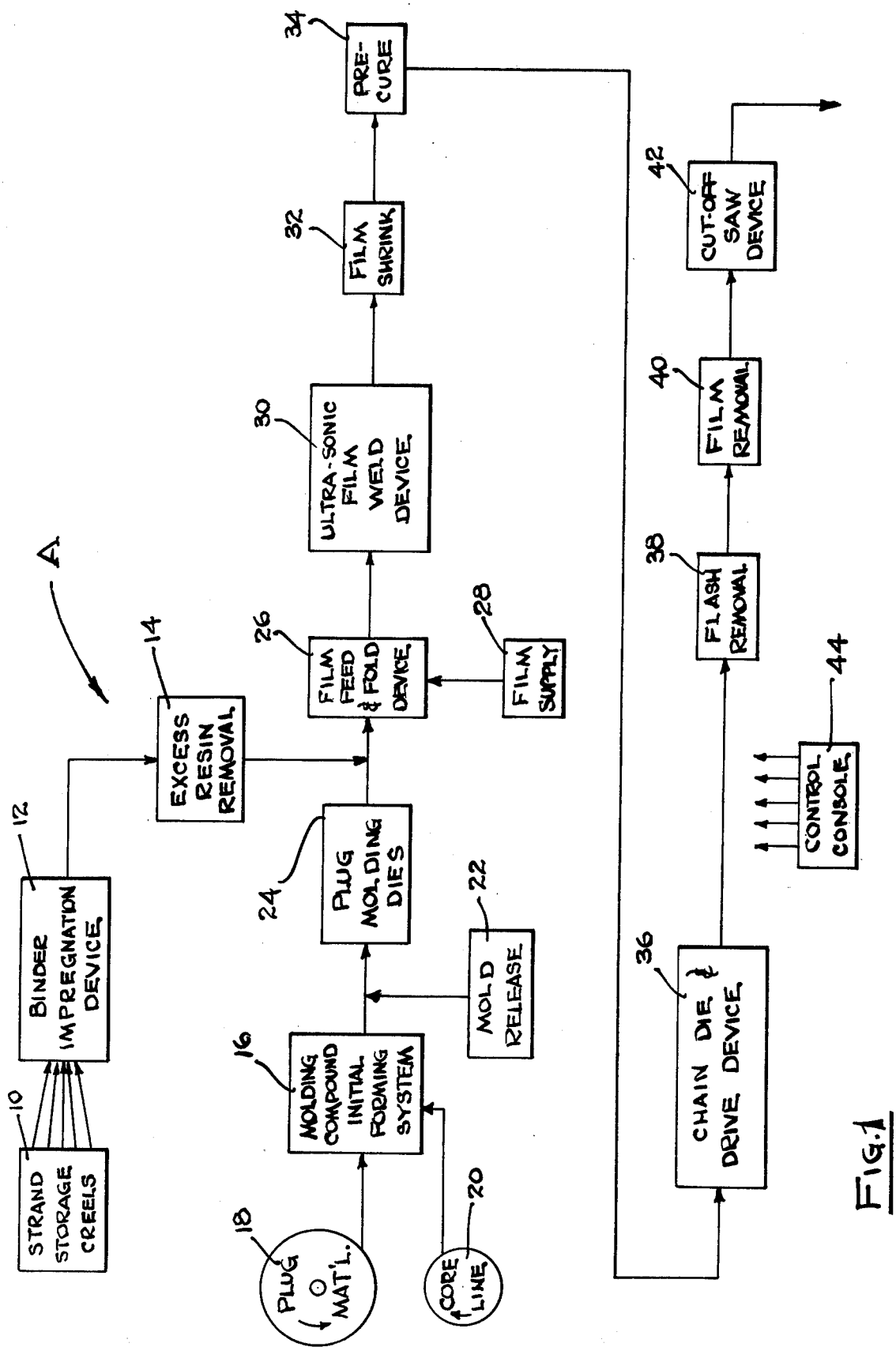

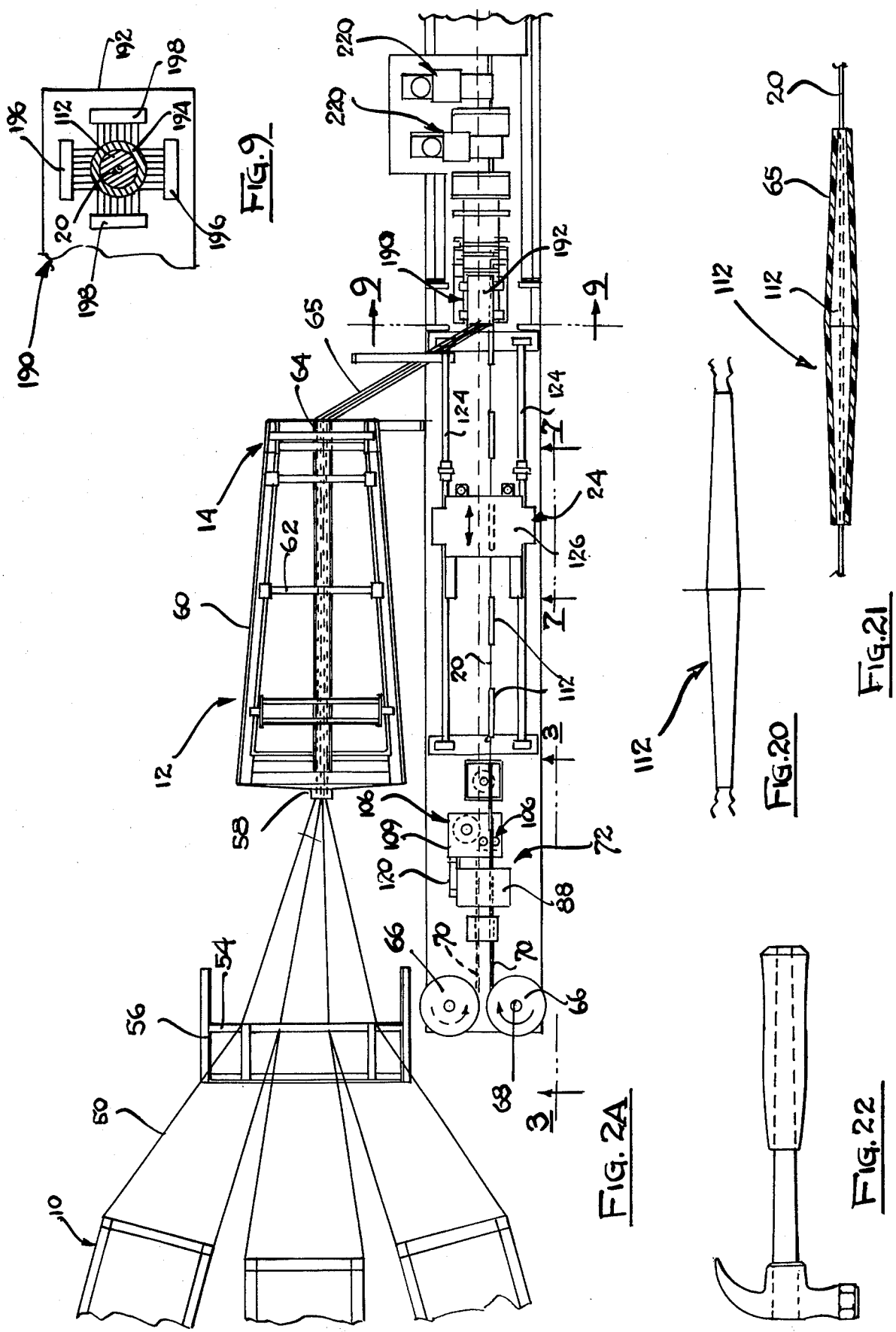

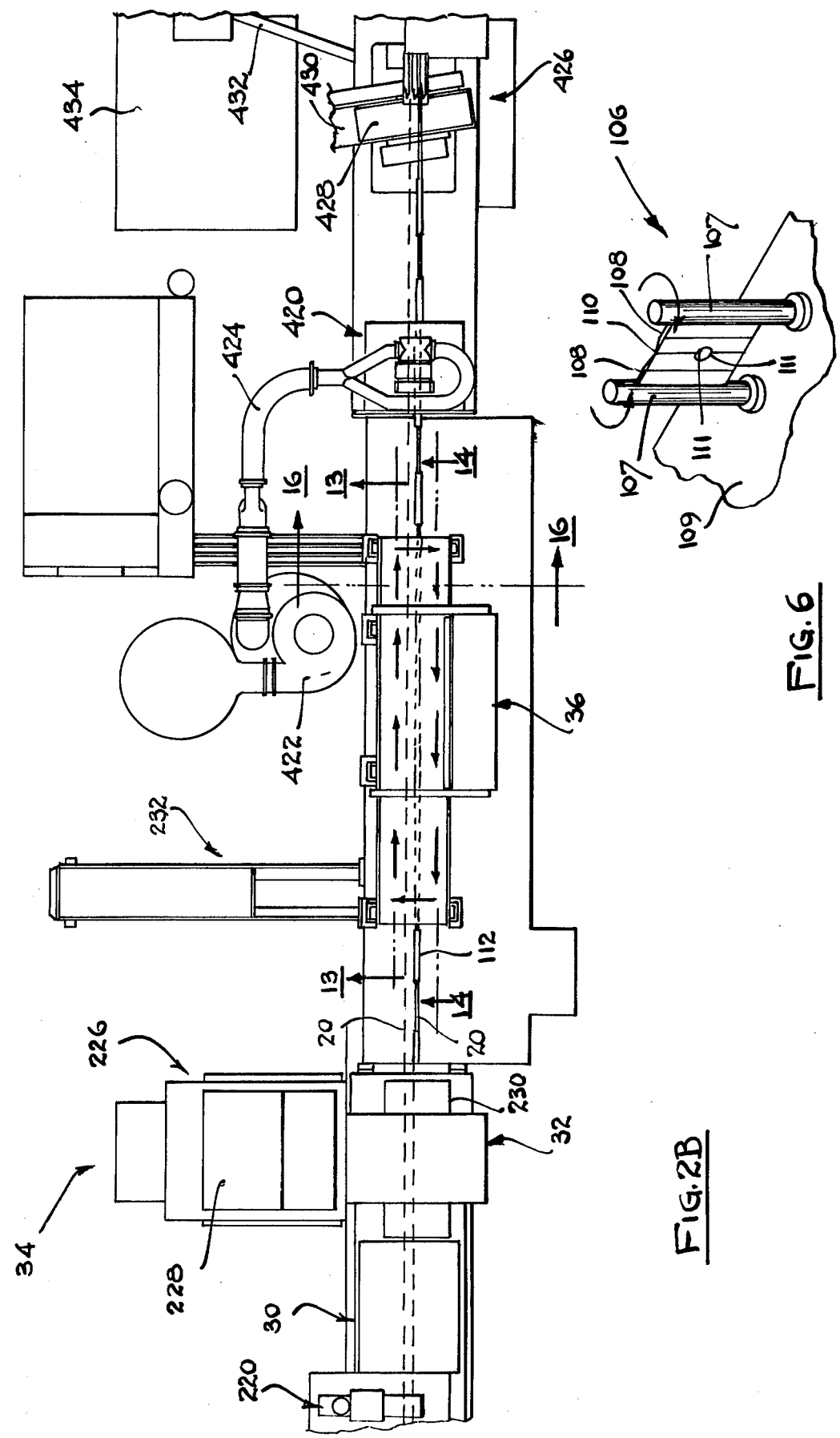

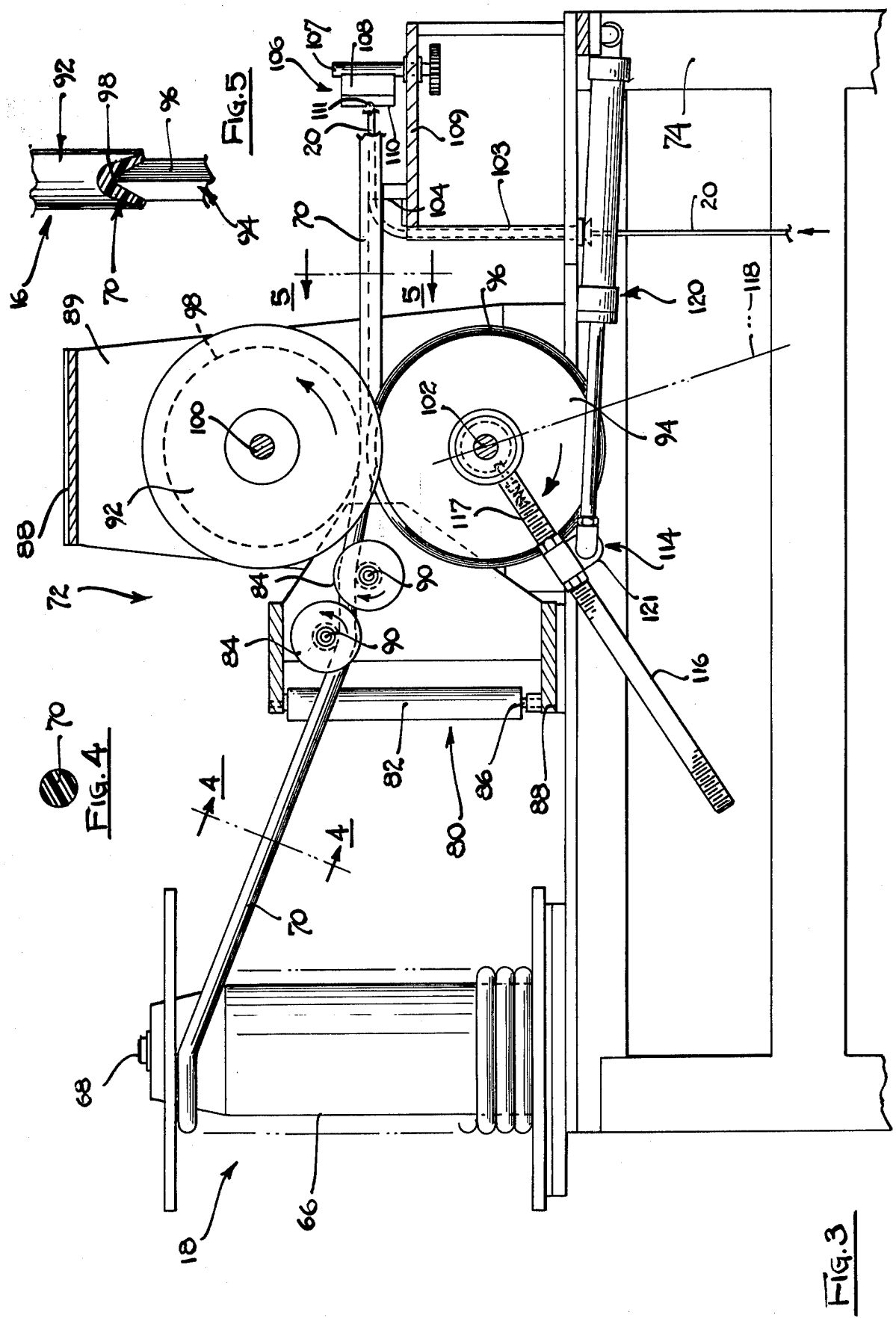

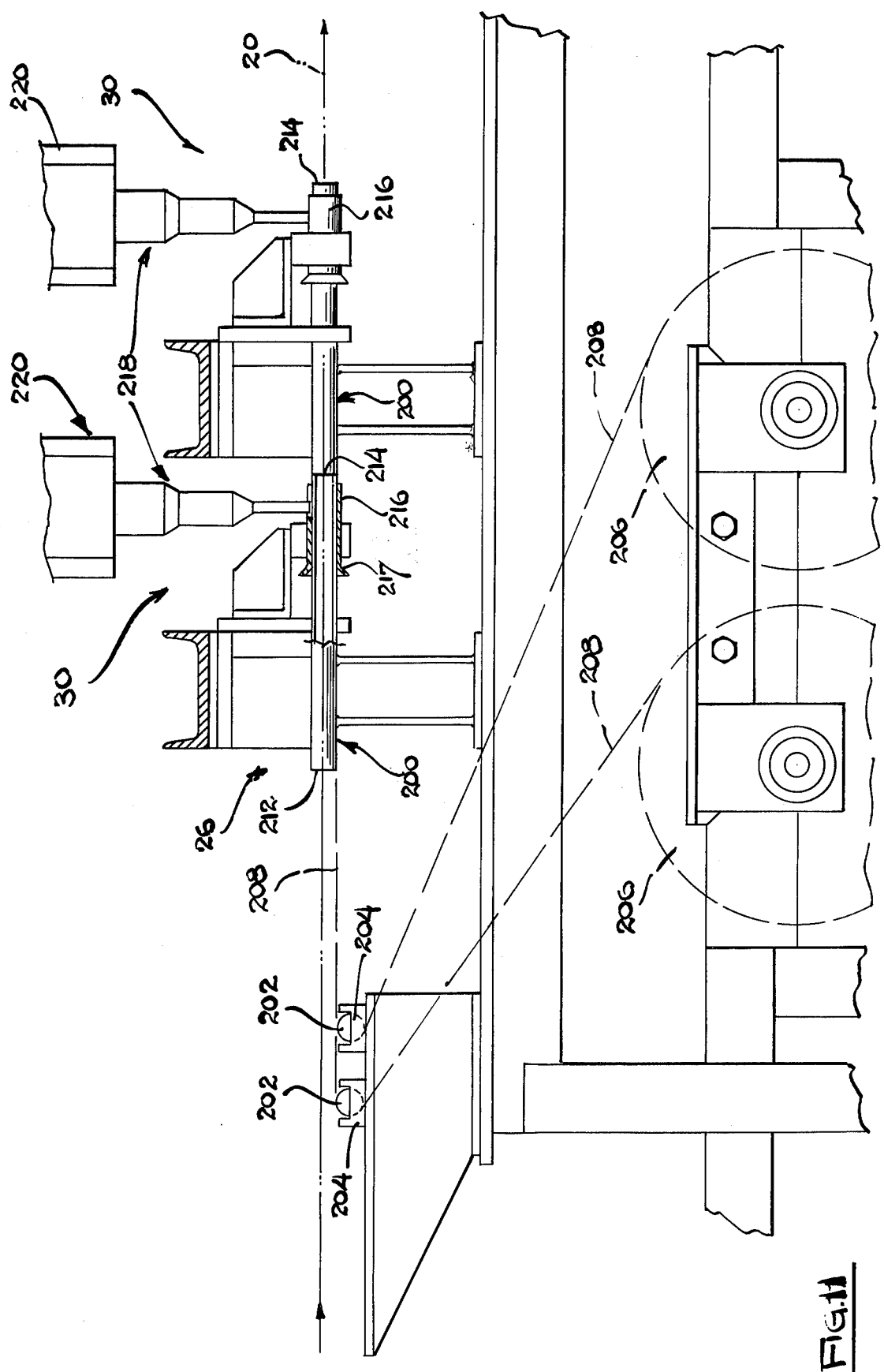

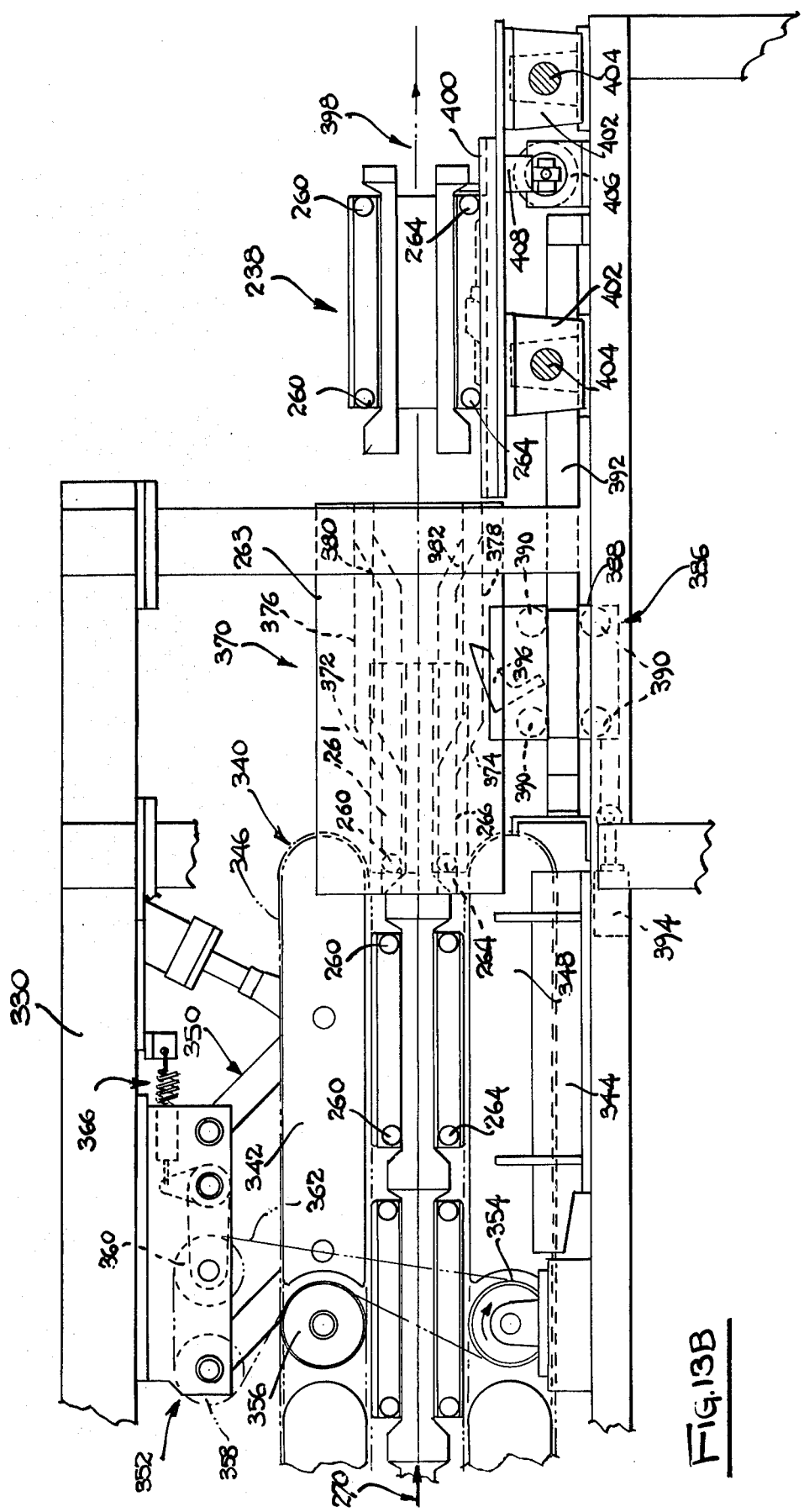

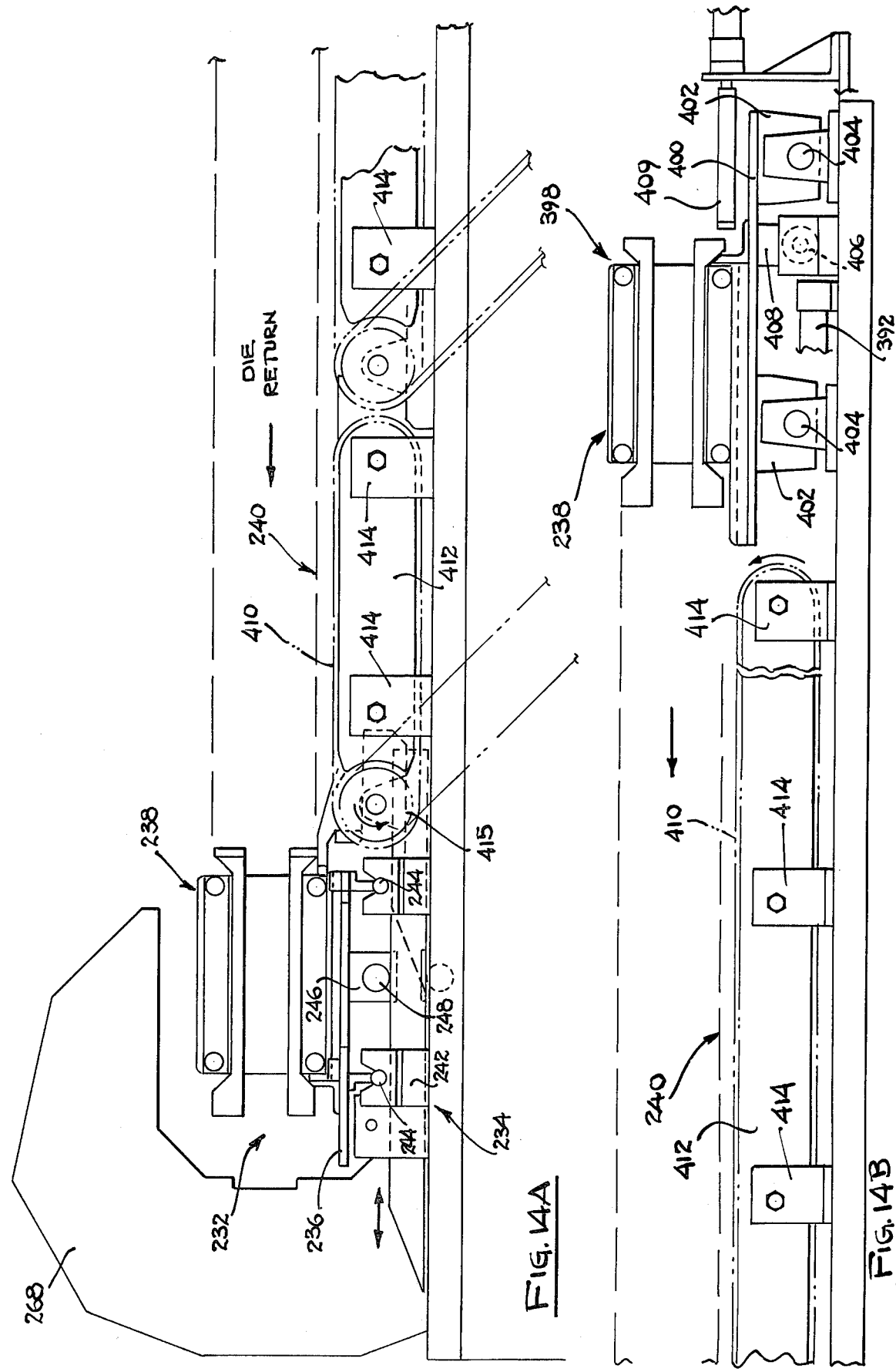

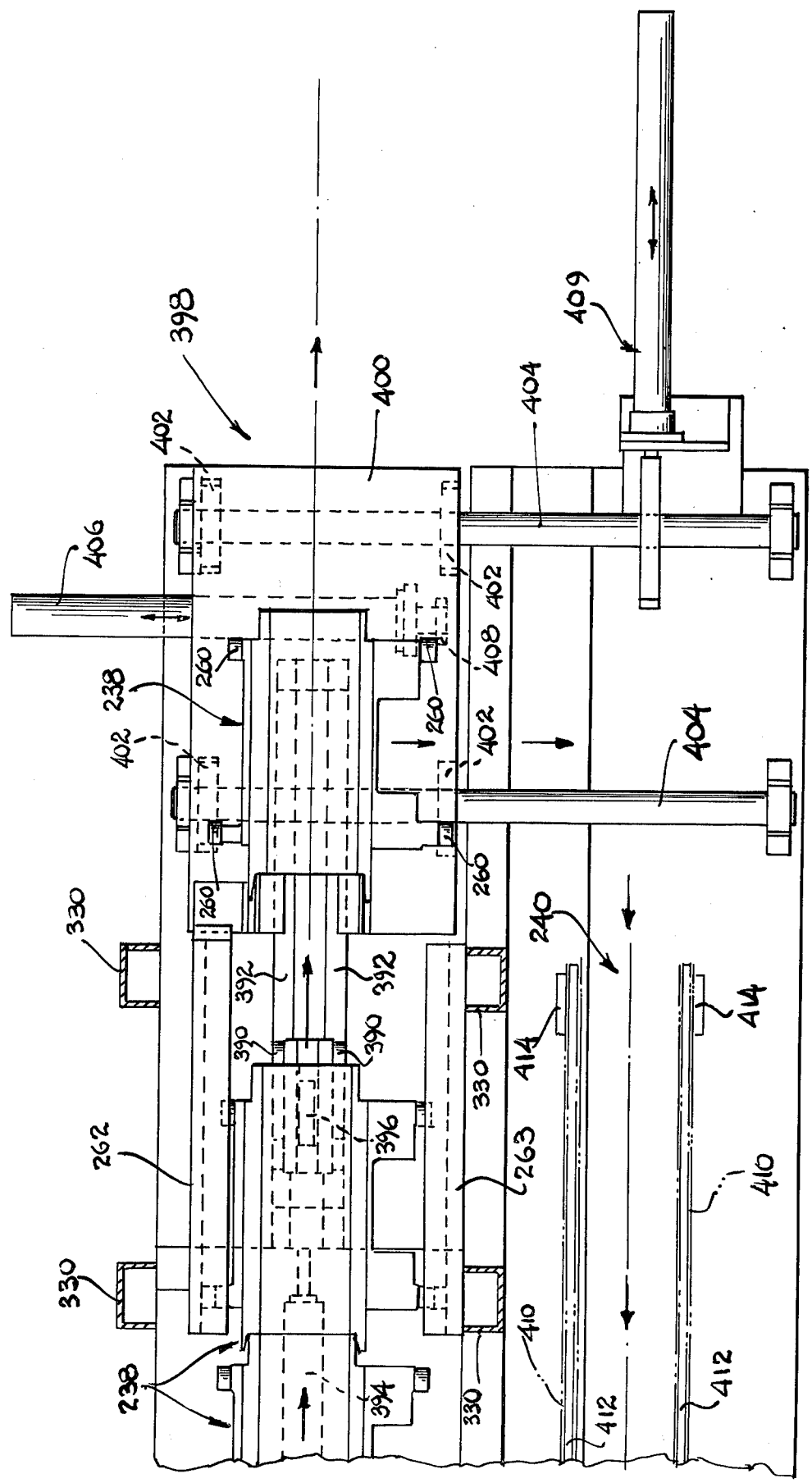

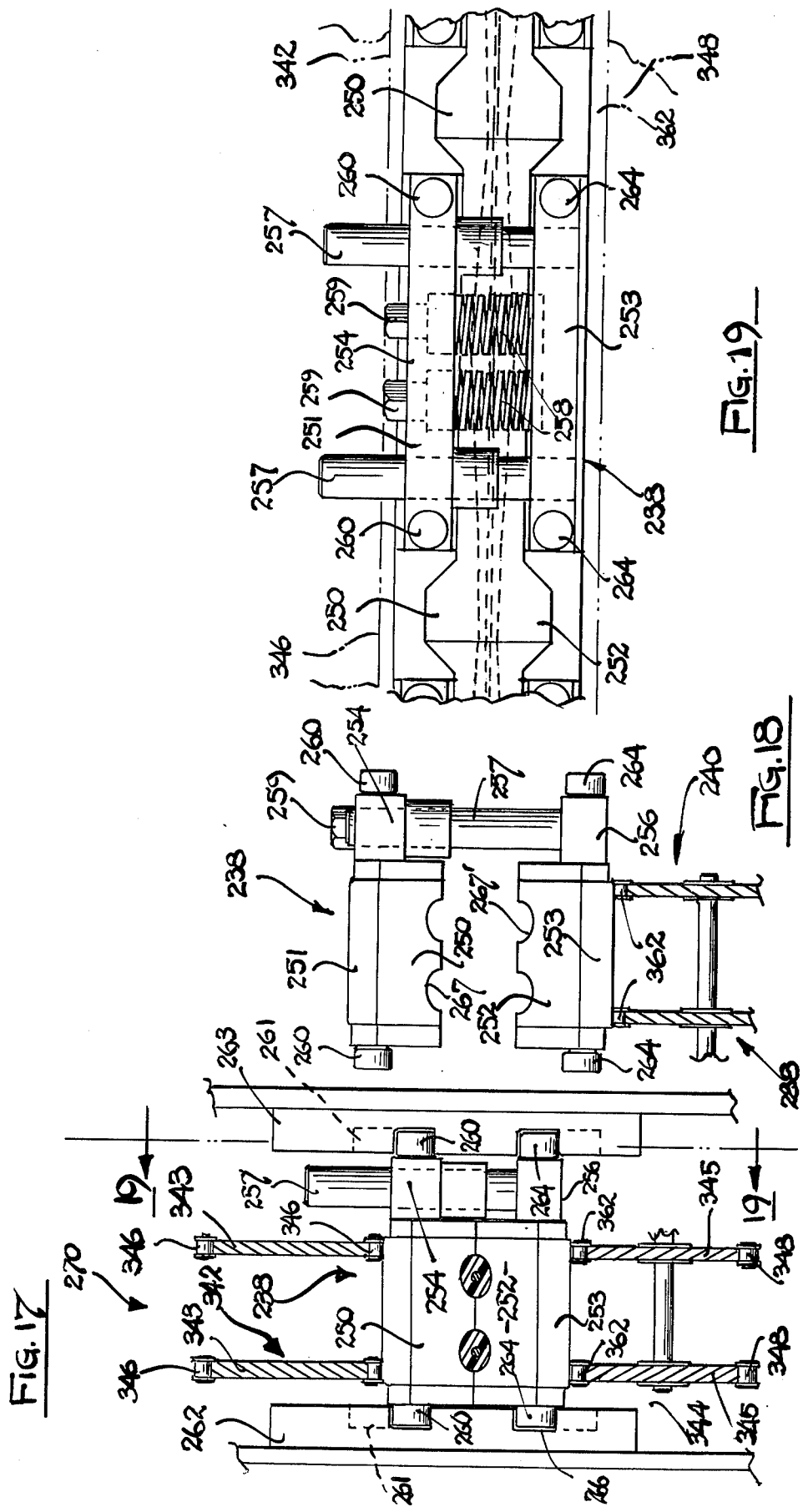

APPARATUS AND METHOD FOR PRODUCING REINFORCED PLASTIC COMPOSITE ARTICLES OF NON-UNIFORM SHAPE AND NON-UNIFORM VOLUME

BACKGROUND OF THE INVENTION

1. Field of the Invention

This invention relates in general to certain new and useful improvements in an apparatus and method for producing fiber reinforced plastic composite articles which may have non-uniform shape and/or volume, or both, over their length, and more particularly, to such articles as well as apparatus and method of the type stated for producing such articles which may have a non-uniform cross-sectional shape and/or volume over their length utilizing a plug of moldable material surrounded by a curable binder impregnated reinforcing material.

2. Brief Description of the Priot Art

In recent years, reinforced plastics have achieved substantial prominence and have found applications in many areas which were previously satisfied by products fabricated of heavy metal and other similar structural materials. Furthermore, improved raw material prices and increased availability of reinforced platic materials have favored the use of reinforced plastic materials and the production of various reinforced composite plastic objects over those fabricated from heavy metals and other similar structural materials.

With the increased use of reinforced plastic objects, there has been the attendant availability of many apparatus for winding filament containing strands about mandrels in order to produce various forms of reinforced plastic objects. One such filament winding system is taught in U.S. Pat. No. 3,740,285, dated June 19, 1973 to William Brandt Goldsworthy et al for winding filament containing strands about a rectangularly shaped mandrel. Another form of filament winding apparatus is more fully illustrated and described in U.S. Pat. No. 3,769,127 dated Oct. 30, 1973 by William Brandt Goldsworthy et al, for winding reinforced plastic composite strands about a hollow tubular mandrel in order to produce pipe forms.

In addition to the above, many pultrusion type apparatus have also been provided for pultruding reinforced plastic objects in the forms of bars, tubes, and other profile forms. The conventional pultrusion apparatus is somewhat analogus to extrusion in that the pultrusion apparatus operates continuously to produce constant-section shapes and profiles which are generally formed of reinforcing fibers impregnated with a hardenable binder, such as a resin matrix impregnated in the reinforcing fibers. The resin impregnated fiber reinforcing material is essentially pulled through a shaping and forming die in a generally linear path by one or more puller mechanisms.

Pultrusion apparatus of this aforementioned type are more fully illustrated and described in U.S. Pat. No. 2,871,911, dated Feb. 3, 1959, to William Brandt Goldsworth et al and in U.S. Pat. No. 3,556,888, dated Jan. 19, 1971 to William Brandt Goldsworthy. In addition, there has been a pultrusion apparatus which is capable of producing objects which are non-linear over their length, as for example, that apparatus described and illustrated in U.S. Pat. No. 3,873,399, dated Mar. 25, 1975 to William Brandt Goldsworthy. However, in each of these cases, the object which was produced has a relatively constant cross-sectional shape and clearly had a relatively constant cross-sectional volume.

There has also been commercially available apparatus for producing resin impregnated fiber reinforced composite materials which are maintained in an A-stage, namely, a stage in which the resin material is not cured, as for example, in U.S. Pat. No. 3,650,864, dated Mar. 21, 1972 to William Brandt Goldsworthy. This apparatus received a conglutinate mass containing resin impregnated fiber reinforced strands which were wrapped in a plastic film and retained for further use at which time the resin impregnated mass could be ultimately cured and bent into a desired shape. However, this apparatus did not produce any final hardened article of non-uniform shape across its length on a continuous basis.

Heretofore, there has been no commercially available apparatus which utilizes filament winding techniques or pultrusion techniques or even, extrustion techniques capable of producing a reinforced plastic composite object of non-uniform shape across its length. In many of the conventional filament winding apparatus, and many of the conventional pultrusion apparatus, the production quality is not constant, and these apparatus often produce stock of both structurally and aesthetically inferior quality, resulting in a high scrap loss.

In the case of the pultrusion apparatus, one of the major causes of poor quality and subsequent rejection of the finished pultruded article, results from the sloughing of the material forming the article which is created by frictional forces within the shaping and forming dies forming part of the pultrusion apparatus. These shaping and forming dies shear the outer resinous surface of the moving composite materials to thereby create an object of poor quality, inasmuch as the sloughing causes pieces of cured resin or a resin reinforced composite to stick to the die tube surface.

Other problems which have arisen in connection with both conventional pultrusion apparatus and conventional filament winding apparatus, is that of curing the reinforced plastic composite as it moves through the forming system. Conventional conductive heating and similar forms of heating or curing were found to be satisfactory in effecting a cure of the resin matrix when relatively small diameter profiles in relatively thin cross-sectional shapes were formed. However, in recent years, newer applications for these products have given rise to a requirement for articles, whether or not pultruded, or filament wound, which are of a fairly thick cross-sectional area. This requirement has posed a need for some effective forming of the object in the initial state and curing of the object in the final process when the object was in the desired cross-sectional shape over its length. Notwithstanding, in all prior art apparatus it was necessary to substantially reduce the "running" rate of the material passing through the apparatus in order to produce an object of the desired shape and size.

In recent years, it has been found that there is a substantial demand for reinforced plastic composite articles in the form of handles e.g. hammer handles, ax handles and like objects. However, there has been no effective commercially available device which is capable of producing these articles from reinforced plastic composite materials where the shape of these articles may not be uniform in either shape or volume or both along their length. Consequently, conventional filament winding apparatus and conventional pultrusion apparatus are not capable of producing such articles on a continuous mass production basis. Thus, many articles of this type have been produced of conventional materials such as wood or the like. The present invention obviates these and other problems through the provision of an apparatus and method which are capable of producing reinforced plastic composite articles which may have a non-uniform shape and/or a non-uniform material volume along their length.

OBJECTS OF THE INVENTION

It is, therefore, the primary object of the present invention to provide an apparatus for producing resin-matrix impregnated filament containing reinforced plastic composite articles which may have a non-uniform shape and a non-uniform material volume over their length.

It is another object of the present invention to provide an apparatus of the type stated which is capable of providing articles which may be of non-uniform shape and volume along their length by surrounding bulk molding material plugs with binder impregnated fiber reinforcing strands and curing the same in order to form a composite articles.

It is a further object of the present invention to provide an apparatus of the type stated which is capable of producing a plurality of articles which may have non-uniform cross-sectional areas across their length and which may be produced in a continuous chain thereof.

It is an additional object of the present invention to provide an apparatus of the type stated which may produce articles having non-uniform cross-sectional areas over their length on a mass production basis with a high degree of efficiency and with minimum manual attention.

It is also an object of the present invention to provide a method of producing resin-matrix impregnated fiber containing reinforced plastic articles which may have a non-uniform shape or volume or both over their length on a continuous basis utilizing an augmented curing procedure.

It is yet another object of the present invention to provide an apparatus and method of the type stated in which reinforced plastic composite articles are produced in a continuous chain and in which the articles may have varying cross-sectional shapes and sizes along their overall length.

It is another salient object of the present invention to produce reinforced plastic composite articles which may have non-uniform cross-sectional shape or volume or both across their length and which utilize a bulk molding core surrounded by curable binder impregnated fiber reinforcing strands.

With the above and other objects in view, my invention resides in the novel features of form, construction, arrangement, and combination of part presently described and pointed out in the claims.

BRIEF SUMMARY OF THE DISCLOSURE

This invention relates to the production of reinforced plastic composite articles which may be non-uniform in cross-sectional size and/or shape over their length. The apparatus may operate with or may comprise a source of filament containing strands or other reinforcing material which may be dispensed from spools or the like and which may be impregnated with a suitable binder, such as a resin curable matrix. In this sense, the objects (or articles) of the present invention which are thus produced by the illustrated and described apparatus and method are reinforced plastic objects in that they are comprised of fiber containing strands of reinforcing material which are impregnated with a suitable resin curable matrix and thereby achieve a final shape when the resin curable matrix is finally cured.

The apparatus of the present invention provides means for producing a basic plug or core from a so-called rope of bulk molding material. In this case, a device is provided for shaping a bulk molding rope of material into a core or plug of roughly the approximate size and shape of the final article to be produced.

This bulk molding compound is continuously extruded in the form of a rope or chain carried by a continuously supplied carrier string. The rope of bulk molding material is separated into discrete sections which form the cores or plugs and are located on the continuously supplied carrier string. The bulk molding compound may adopt a form of a polyester or similar material which is somewhat moldable and may contain fiber reinforcing materials, as for example, chopped glass, or the like, in order to have a putty-like consistency. The core or plug is provided with sufficient material so that it will roughly contain the same volume of material as the plug or core in the final reinforced platic composite object or article.

The core or bulk molding compound comprising and forming the sequentially spaced apart plugs on the carrier string is pulled continuously through the apparatus by a drive system hereinafter described in more detail. Each of the individual plugs or cores of bulk molding compound are introduced into an initial forming and shaping mold or so-called "pre-mold" comprised of a pair of split pre-mold elements. The pre-mold does not literally mold the plugs into the desired shape, but actually cold forms the plugs into a shape somewhat approximating the final shape of the article to be produced. Thereafter, roving strands and typically bundles of roving strands are brought together in contact with and surround the preformed plug so that the strands generally fully encapsulate the plugs. The strands of material have been preimpregnated with a suitable resin-matrix, as heretofore described, although the cure of the matrix has not been initiated. The number of layers of strands enclosing the plug is not absolutely critical, and the exact number thereof will be based upon the final strength of the reinforced plastic composite article to be produced and related factors.

The plugs and the enclosing strands are sequentially introduced into a film feeding and wrapping device in which a shrinkable film is wrapped about the strands enclosing the plugs. This latter device may also wrap the film about the cord or string retaining the strand enclosed plugs although this wrapping around the cord is not necessarily required for the purposes of the present invention. The film feeding and wrapping device may adopt the form of that device more fully illustrated and described in U.S. Pat. No. 3,576,705, dated Apr. 27, 1971, by William Brandt Goldsworthy, or the device described in U.S. Pat. No. 3,654,028, dated Apr. 4, 1972 by William Brandt Goldsworthy. In essence, the film feeding and wrapping device will wrap the shrinkable film around the strands enclosing the plugs as previously described. The film is preferably a uniaxially oriented film so that it is shrinkable in one direction, and preferably shrinkable in a transverse direction as wrapped around the binder impregnated and curable strands enclosing the plugs.

The apparatus also comprises a film welding device which effectively welds the upper longitudinal margins of the shrinkable film as it is wrapped around the various strand enclosed plugs and, if desired, it may weld the longitudinal margins of fiber containing sheets which may surround the core plugs. Preferably, this welding device is an ultrasonic film welding device and when the upper longitudinal margins are welded, the strands which surround and enclose the plugs are completely wrapped in the shrinkable film and are hermetically sealed in this film.

Thereafter, at this point in the operation, the individual film wrapped strand enclosed bulk molding plugs on the continuous string are introduced into a film shrink tunnel, which is designed to provide the proper amount of radiation to shrink the uniaxially oriented film about the strand enclosed plugs. However, the amount of radiation introduced into each strand enclosed plug and the surrounding film is not sufficient to initiate a curing of the resin-matrix composition which was impregnated into the fiber containing strands initially wound upon the plug.

At this point, in the process of the present invention, the plug is still shapeable into a desired shape, although it is at least slightly rigid in order to retain the shape initially imparted thereto, in the pair of split mold elements. The composite of film wrapped strand enclosed plug is somewhat similar to an A-stage profile form of the type described in U.S. Pat. No. 3,769,127, to William Brandt Goldsworthy, although the composite of the present invention is somewhat more rigid so that it generally retains the shape imparted by the split mold elements. The resin matrix impregnated into the film containing strands remains in the A-stage, that is, the stage where it is not cured, so that the composite is still bendable and moldable. This is unlike the B-stage profile form which is partially cured and more certainly, unlike the C-stage profile form, which is fully cured and completely unbendable or formable. The film will also generally provide a relatively smooth or polished surface finish to the article thus produced after the film is removed, as hereinafter described. In this way highly polished mold elements are not required, and no final finishing operation is required.

The apparatus of the invention also comprises the aforementioned drive system which may adopt the form of a chaindrive system and which is capable of pulling the cord or string containing the film wrapped strand enclosed compositites through the apparatus. The chain drive system may adopt the form of a continuous conveyor belt which engages and completely pulls the cord of film enclosed composites through the apparatus. However, other forms of drive mechanisms may be employed.

After the film enclosed strand wrapped plug composites on the cord or string have been moved beyond the shrink tunnel, they are introduced into a matrix curing generator, as for example, through a radio frequency generator which initiates the exothermic reaction of the resin matrix and thereby starts a curing of the matrix impregnated into the reinforced plastic composite material. In this case, the radio frequency generator, or other curing mechanism, is designed to apply the proper amount of radiation so as to only initiate the exothermic reaction of the resin matrix, but not initiate a full cure of the same to the C-stage and generally not even to the B-stage.

The film enclosed composites on the continuously moving string are sequentially introduced into a final mold comprised of a pair of split-mold elements which impart a desired final shape to the composites. The radiation which is applied by the pre-curing radio frequency generator is not sufficient to immediately cure the resin matrix. In this way, the film enclosed composite of strands and plug can be distorted into the desired shape in the final mold. In the actual process of molding, enough pressure is applied to literally shape the material into a desired form. The strands and plug material are still somewhat pliant (that is with a putty-like consistency) in order to assume the desired shape in accordance with that provided by the split mold dies. The strands and plugs are often described as being somewhat fluid in this stage and this implies the putty-like consistency in that the materials are moveable but will generally retain a shape after a force moving the material is removed.

The continuous chain containing the film enclosed plugs is moving at a speed sufficient so that the film wrapped strand enclosed plugs can be introduced into a final mold comprised of the pair of split mold elements. In this case, the mold is not literally molding the strands and the bulk material plug or core, but is effectively shifting the material into the desired final shape. A final curing means is associated with the final mold to apply a curing radiation to the strand enclosed plugs and thereby advance the cure of the plugs and resin matrix to the C-stage. Induction heaters may be employed for this purpose.

In one embodiment of the present invention, it is possible to produce, for example, hammer handles which have non-uniform cross-section and non-uniform volume over their length. However, other forms of articles may be produced in accordance with the present invention. With respect to the use of the final split mold dies, the material is merely flowing from one area to another in order to distort the bulk compound into the desired shape. The reinforcing material is not being displaced, except in conformity to the bulk molding material it may surround, at this point in the process. Hence, there is no substantial flowing of reinforcing material which occurs in a molding operation, as for example, the pre-molding operation. In addition, it is not desirable to have significant material flow inasmuch as any substantial material flow would destroy the strength imparted by the fiber containing strands.

At the downstream end, the split mold dies are opened and the string and the articles on the string which have been produced are moved into a flash removal assembly which removes excess material from portions of the articles which are produced. Each of the articles on the chain are introduced into a film removal assembly which effectively strips the film from the articles. Thereafter, a cutoff saw assembly is utilized to automatically sever each of the articles from the continuous string thereof.

The reinforced plastic composite articles, which may be produced in accordance with the present invention, while having a non-constant cross-sectional shape, may have a non-constant cross-sectional volume, as aforesaid. In other words, the article may have a first portion of a first cross-sectional shape and a second portion of a cross-sectional shape, different than or the same as that of the first cross-sectional shape, and which first and second portions each contain different volumes of material. Thus, the article may have a first portion of a first cross-sectional shape and a second integrally formed portion of a different and second cross-sectional shape and where the second portion has a greater volume of reinforced plastic composite material than that forming said first portion.

The articles which are produced in the illustrated and described embodiment are generally straight over their length, that is they are uniform about a central longitudinal axis. The articles are produced in a continuously formed stream, and may be separated from one another as they exit the die cavity as described herein.

The terms "filament containing reinforced plastic composite article" and "filament containing reinforcing material" and similar terms merely imply that the reinforcing material, whether separate or incorporated in the composite article, is comprised only of fibers or filaments, or that a very substantial portion of the material is comprised of fibers or filaments (when not impregnated or coated with a resin matrix). Thus, for example, a smaller portion of the reinforcing material could be comprised of non-filament or non-fiber materials such as wires or the like as hereinafter described.

This invention possesses many other advantages and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such descriptions are not to be taken in a limiting sense.

BRIEF DESCRIPTION OF THE DRAWINGS

Figure 7:
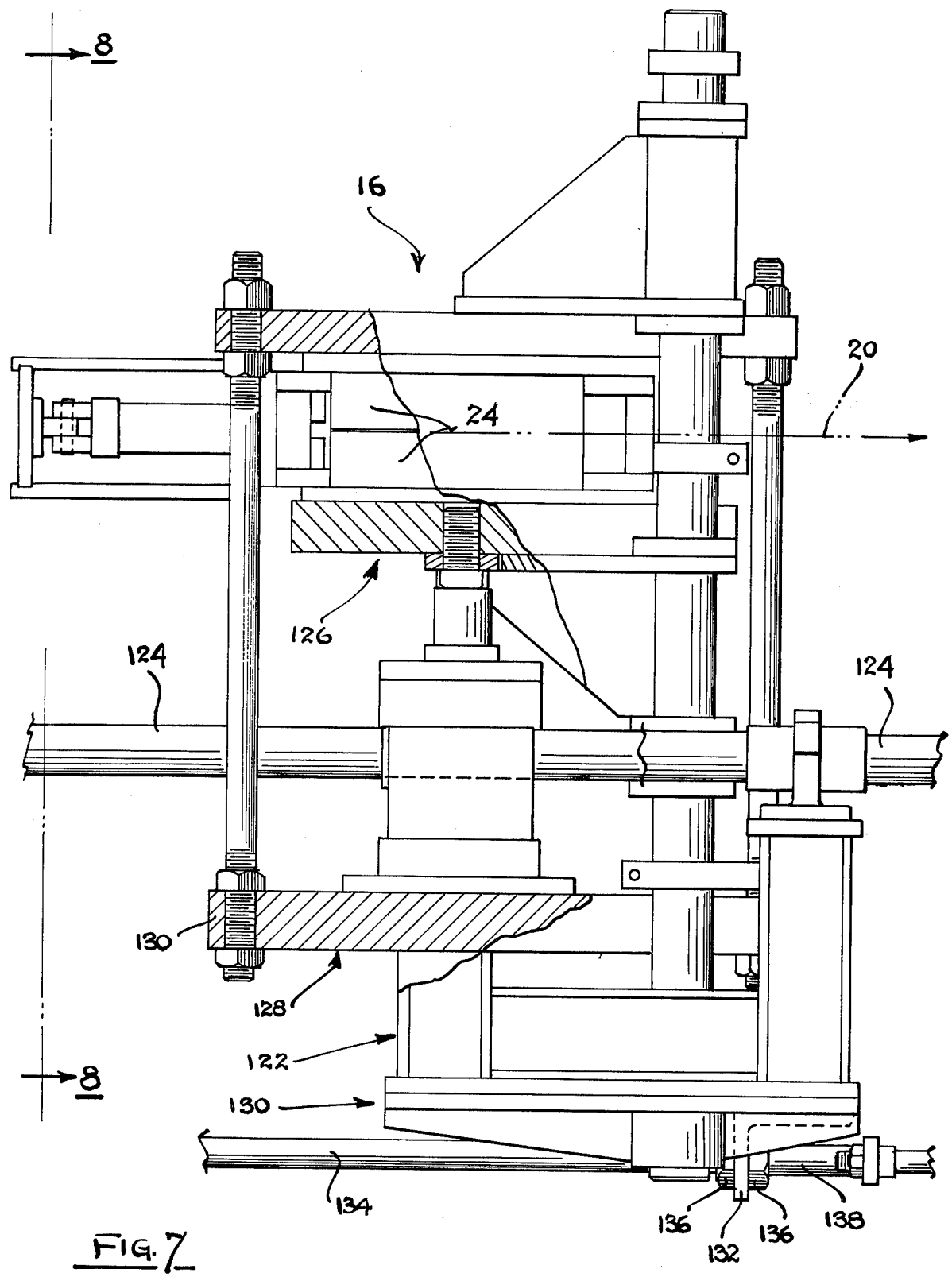
Figure 8:
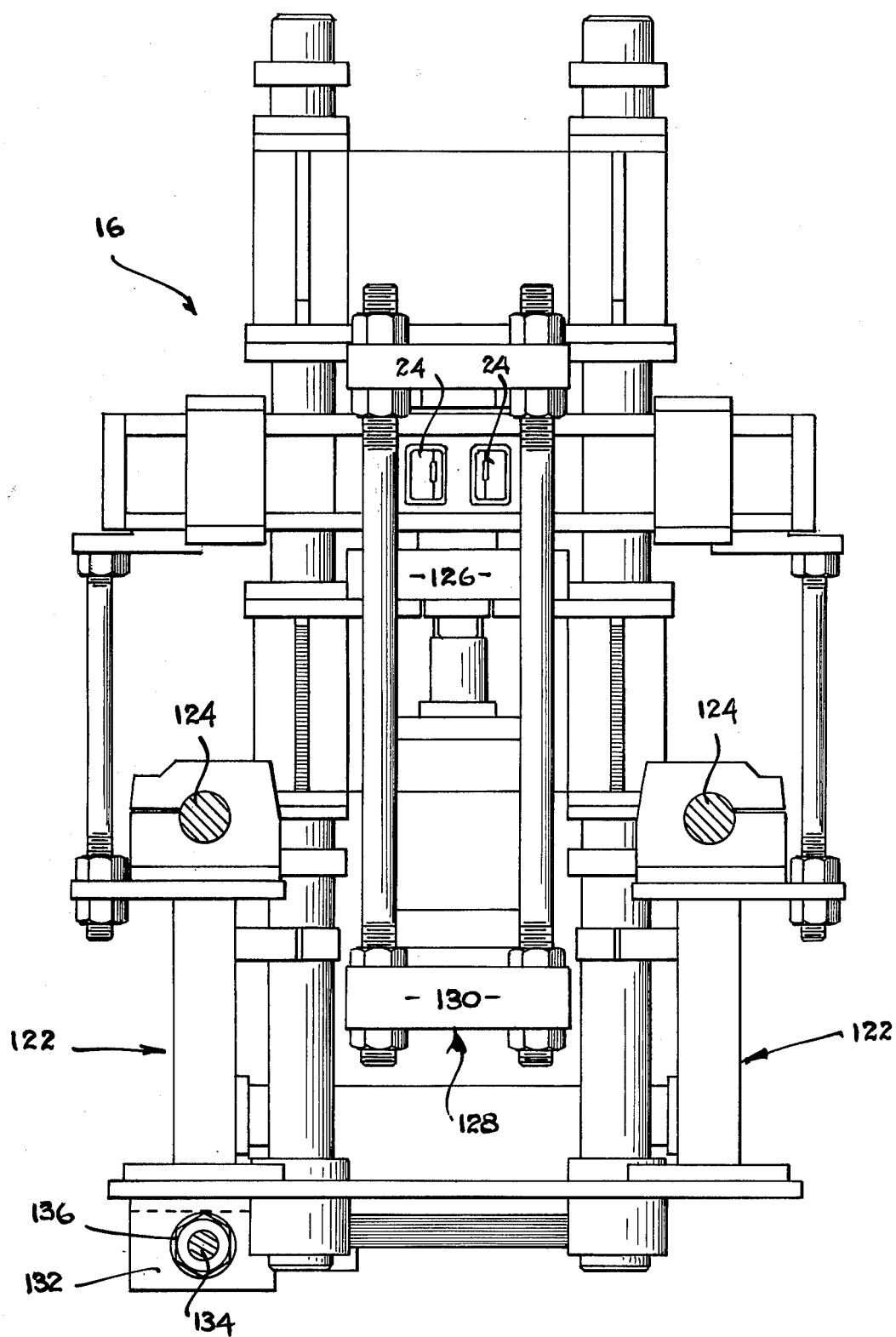
Figures 10, 12:
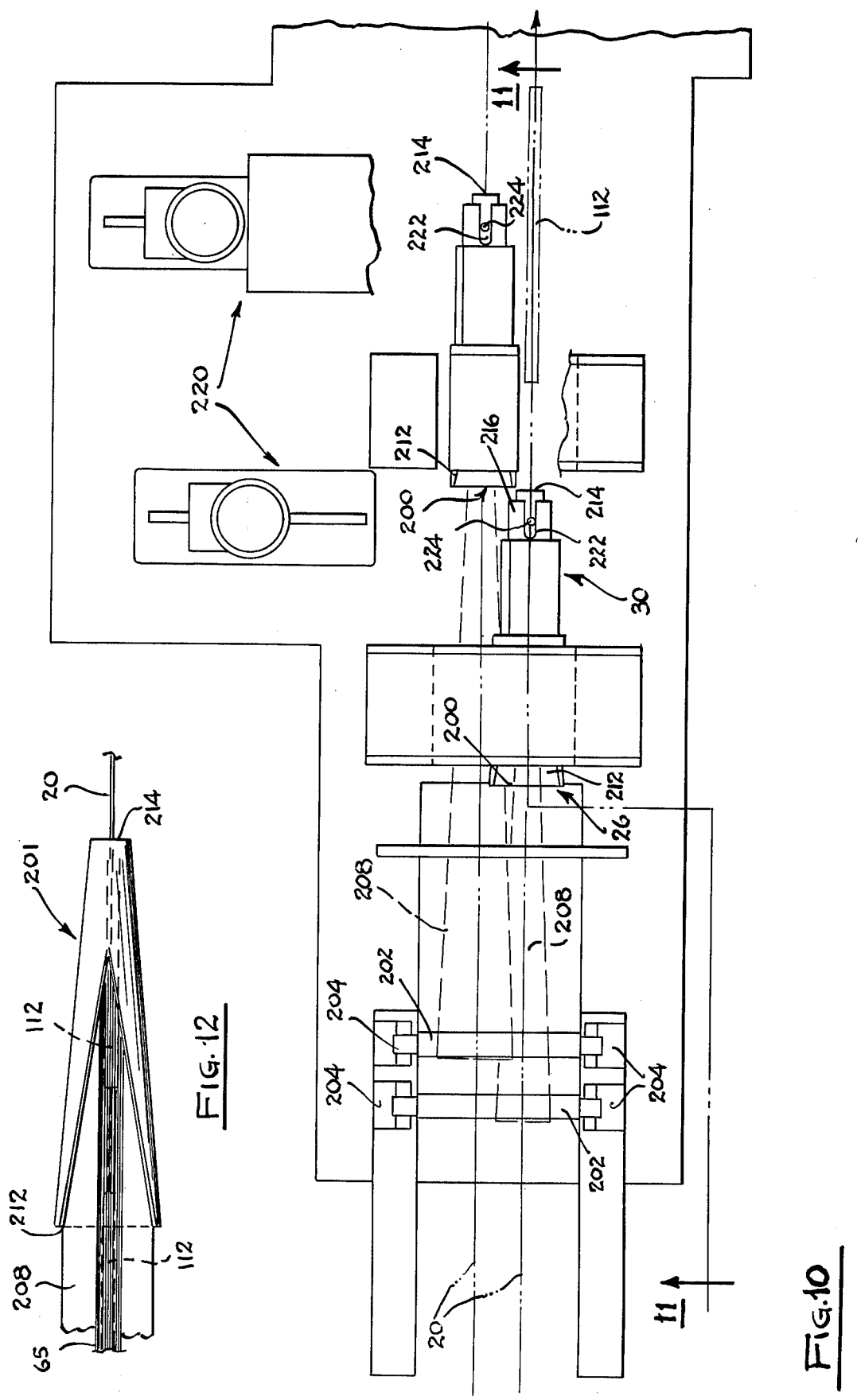
Figure 13A:
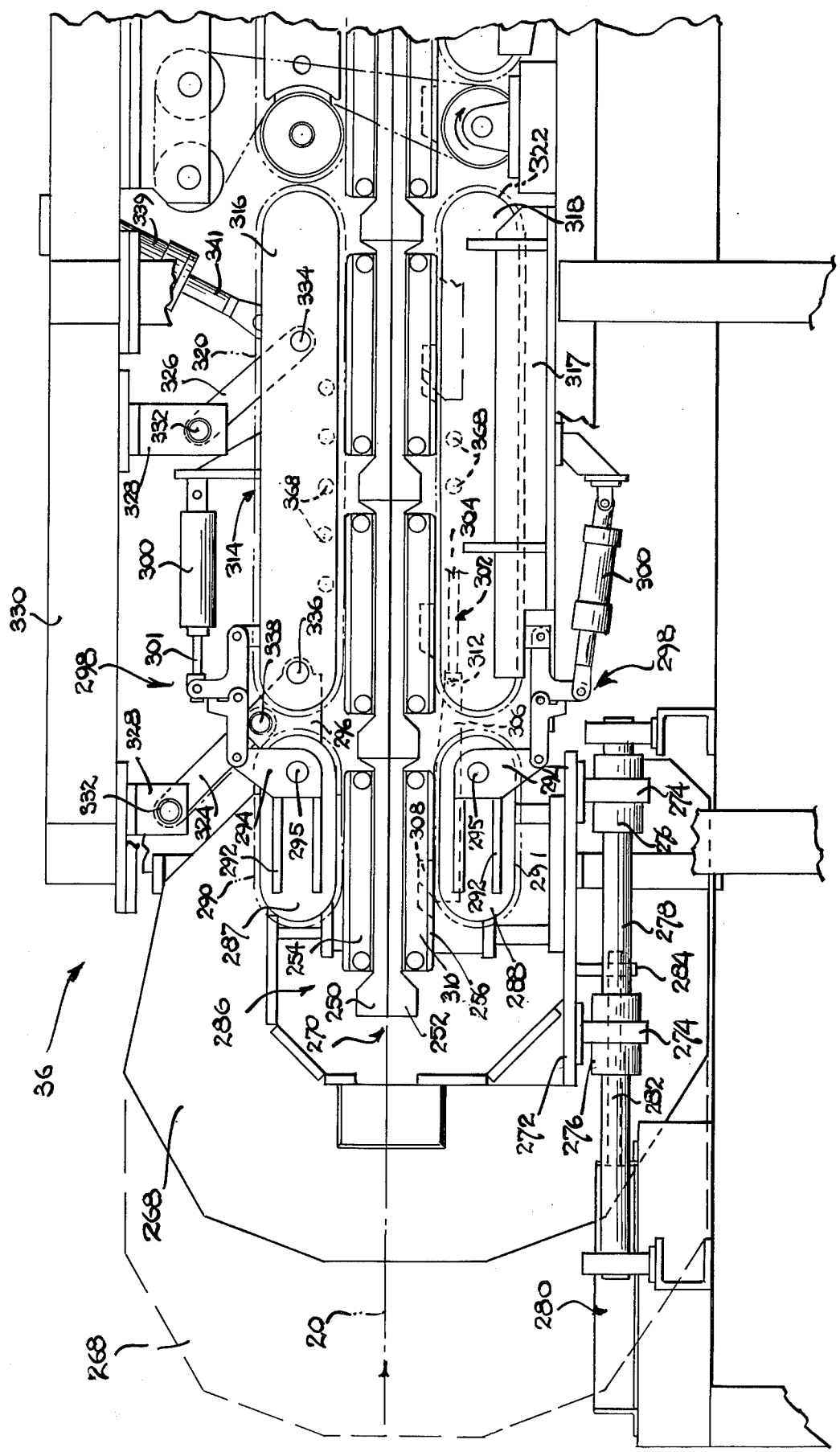
Figure 15A:
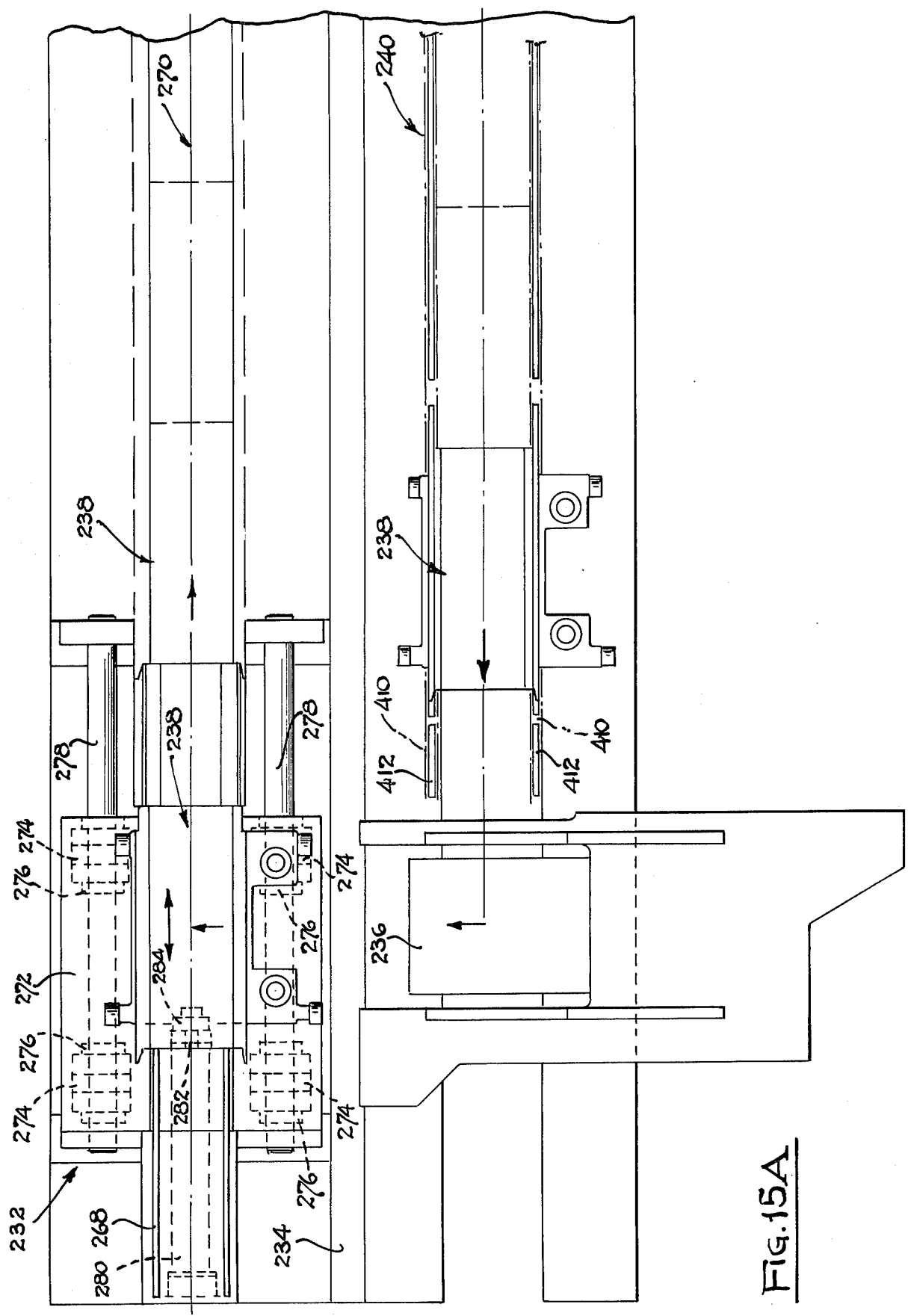
Figure 16:
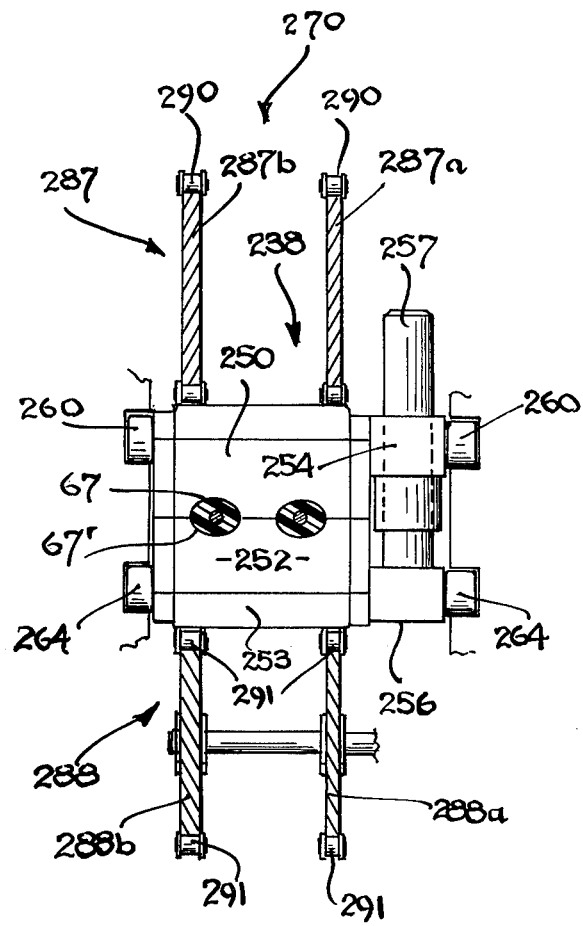

Having thus described the invention in general terms, reference will now be made to the accompanying drawings (14 sheets) in which:

FIG. 1 is a schematic top plan view in block diagram form of one embodiment of an apparatus constructed in accordance with, and embodying the present invention;

FIGS. 2A and 2B are composites of a top plan view of the apparatus forming part of and embodying the present invention;

FIG. 3 is a side elevational view of a plug generating device forming part of the apparatus and which is constructed in accordance with and embodying the present invention and taken substantially along the plane of line 3—3 of FIG. 2A;

FIG. 4 is a sectional view taken along line 4—4 of FIG. 3 and showing the raw plug-forming material initially dispensed from a spool thereof;

FIG. 5 is a sectional view taken along line 5—5 of FIG. 3 and showing a portion of the plug material after it has been partially formed and shaped;

FIG. 6 is a fragmentary perspective view of a pair of notched cutting elements forming part of the plug generating device of the present invention;

FIG. 7 is a side elevational view, partially broken away and in section, and showing a portion of the plug pre-molding device, forming part of the apparatus and taken substantially along the plane of line 7—7 of FIG. 2A;

FIG. 8 is a vertical sectional view, showing a portion of the pre-molding device of FIG. 7 in more detail, taken essentially along the plane line of 8—8 in FIG. 7;

FIG. 9 is a vertical sectional view taken along line 9—9 of FIG. 2A and showing a mechanism for enclosing a plug in reinforcing strands;

FIG. 10 is a top plan view of a composite film wrapping and sealing mechanism forming part of the apparatus of the present invention;

FIG. 11 is a vertical sectional view taken substantially along line 11—11 of FIG. 10;

FIG. 12 is a top plan view of a funnel-like wrapping tube which may form part of a film feed and fold device of the apparatus of the present invention;

FIG. 13 is a composite of FIGS. 13A and 13B in vertical sectional view, taken substantially along line 13—13 of FIG. 2B, and showing a chain drive and mold mechanism forming part of the apparatus of the present invention;

FIG. 14 is a composite of FIGS. 14A and 14B in side elevational view, taken substantially along line 14—14 of FIG. 2B and where each of these Figures 14A and 14B show the carriage forming part of the chain drive and mold mechanism in different end positions;

FIG. 15 is a composite of FIGS. 15A and 15B in top plan view showing the chain die and drive mechanism of FIGS. 13 and 14;

FIG. 16 is a vertical sectional view showing one of the molds in the closed position in an initial die compression section forming part of the chain drive and mold mechanism of FIGS. 13-15;

FIG. 17 is a vertical sectional view showing one of the molds in the closed position in a die expansion section forming part of the chain drive and mold mechanism of FIGS. 13-15;

FIG. 18 is a fragmentary vertical sectional view, somewhat similar to FIG. 16, and showing the mold in the opened position;

FIG. 19 is a vertical side elevational view taken along line 19—19 of FIG. 17;

FIG. 20 is a fragmentary side elevational view showing a reinforced plastic composite article produced in the apparatus and in accordance with the method of the present invention;

FIG. 21 is a vertical sectional view showing the overall internal construction of the article with a connecting cord extending therethrough; and FIG. 22 is a side elevational view of a hammer handle produced and using the reinforced plastic composite article of the present invention.

DETAILED DESCRIPTION OF A PREFERRED EMBODIMENT

Referring now in more detail and by reference characters to the drawings which illustrate a preferred embodiment of the present invention, A designates an apparatus for producing reinforced plastic composite articles which may have a non-uniform cross-sectional shape and may also have a non-uniform cross-sectional volume over their length. The apparatus is more fully illustrated in the schematic diagram of FIG. 1, which also serves as a schematic flow chart to more fully illustrate the method performed in accordance with the present invention.

The apparatus A may be provided with or may be used in conjunction with a source of filament containing reinforcing material, such as storage racks or creels 10, for providing strands of filament containing reinforcing material as hereinafter described in more detail. While strands of reinforcing material, such as glass or boron, etc. are used, it should be understood that other forms of reinforcing materials could be employed, such as webs, sheets or the like.

The reinforcing strands are thereafter introduced into an impregnation task 12 containing a suitable binder, such as a resin matrix, which is adapted to be impregnated into the various strands of reinforcing material. This binder, such as the resin matrix, is capable of being hardened when cured. After impregnation, the impregnated strands pass through an excess resin removal system 14 comprised of squeeze-out and forming bushings in order to remove an excess of the resin or other binder and to initially provide some rough form or cross-sectional shape to the strands of reinforcing material, namely to provide bundles thereof.

The apparatus A also comprises a plug forming mechanism 16 which includes a source of plug molding material 18 and a source of a core-line 20, often referred to as a "cord" or a "string", as also illustrated in FIG. 1. The plug-molding material is preferably a type of bulk molding compound, as hereinafter described in more detail, and which is initially provided with a shape such as an inverted U-shape to be draped over the core-line 20. This core-line or string 20 serves as a carrier for a plurality of individually spaced apart plugs of bulk molding compound and which also moves these plugs through the apparatus.

Thereafter, a mold release agent from a mold release device 22 is applied to the bulk molding compound on the core-line. This bulk molding compound is divided into discrete sections and the discrete sections are then introduced into plug molding dies 24 which from part of a so-called pre-mold to form the plugs of bulk molding material.

At this point in the apparatus and in the process, the resin impregnated reinforcing material is then applied to the plugs of molding compound, as for example, by being disposed around the bulk molding plugs. Thereafter, the strand enclosed plugs are introduced into a film feed and fold device 26 which receives a supply of film, such as a shrinkable plastic film, from a film supply source 28. The film feed and fold mechanism thereupon applies the shrinkable film to the strand enclosed plugs and wraps the same around the strand enclosed plugs.

The film wrapped and strand enclosed plugs are then introduced into an ultrasonic film weld device 30 which is adapted to seal longitudinal edges of the film wrapped about the strand enclosed plugs. In this way, the plugs of bulk molding compound with the strands wrapped there around are essentially encapsulated in the film. The film wrapped strand enclosed plugs are then introduced into a film shrink device 32 which is adapted to shrink the film about the strand enclosed plugs to thereby tightly encapsulate these plugs within the shrunken film.

The plugs which are strand wrapped and film enclosed are then introduced into a pre-curing mechanism 34, such as a radio frequency curing mechanism, which applies a curing radiation to the materials such as the resin matrix impregnated in the strands. This pre-curing mechanism actually forms part of an augmented curing system, as hereinafter described in more detail.

Thereafter, the film enclosed strand wrapped plugs are introduced into a chain die and drive device 36. The plugs of bulk molding material with the strands wrapped there about are then imparted a final shape by the chain die and drive device 36 which also serves as a final mold. Further, the chain die and drive device also has means for curing so as to impart a final cure to the binder, such as the resin matrix, and to the bulk molding material.

After exiting the chain die and drive device, the hardened composites of strand enclosed plugs which then essentially constitute the reinforced plastic composite articles are introduced into a flash removal device 38 for removing excess portions of the bulk molding material and then a film removal device 40 for removing the shrinkable film about the articles. A cutoff mechanism 42 is adapted to sever the individual articles from the continuous string to provide the individual discrete reinforced plastic composite articles.

A control console 44 may be provided and forms part of an overall control system which is designed to maintain control of the entire apparatus. The apparatus itself can be constructed so that it is capable of operation under the control and monitor of one operator.

The details of the construction of the apparatus and the attendant steps used in formation of the reinforced plastic composite articles is more fully illustrated and described in connection with FIGS. 2–22 of the drawings. Referring now to FIG. 2A, it can be observed that the strand storage device comprises a plurality of storage creels which may be in the form of racks containing spools (not shown) of fiber containing reinforcing materials. The exact means of dispensing the fiber containing reinforcing material from the spools (not shown) is conventional and is therefore neither illustrated nor described in any further detail herein.

Strands 50 of reinforcing material which are removed from the spools are introduced into carding plates 54 on a strand sorting frame 56. The various strands 50 are thereupon moved through a gathering funnel or tube 58 and introduced into a resin matrix impregnation tank 60 forming part of the binder impregnation device 12. The tank 60 may be tapered from the inlet end to the outlet end and is provided with a plurality of suitable hold-down rollers 62 for retaining the strands within the bath of liquid resin matrix.

The apparatus may also be provided with the excess resin removal device 14 which may be separate from or may be physically attached to the binder impregnation device 12. In the embodiment as illustrated in FIG. 2A, the excess resin removal device 14 is actually physically attached to the resin tank 60 and comprises a plurality of squeeze-out and forming bushings 64. The strands which pass through these bushings are provided with some initial form, such as a circular shape, and the excess resin is drained from the strands, preferably back into the tank 60. These squeeze-out and forming bushings 64 also form the strands into individual bundles, as aforesaid, so that the strands exit the impregnator as a throughly impregnated stream 65 of binder impregnated reinforcing material.

The apparatus and method may use and the resultant reinforced plastic product may be comprised of reinforcing material in the form of filament containing strands, otherwise, filament containing mat material may be used. In addition, in one aspect of the present invention, a combination of both the mat or strand material, or web, tape or sheet material can be used. It is also possible to use different reinforcing materials, such as for example, boron strand material and glass web material, etc.

Any of a wide variety of fiber containing materials may also be utilized. The strands of reinforcing material, may contain chopped fibers. The reinforcing materials may be formed of any natural or synthetic continuous filament, which is capable of being deformed to a desired shape. The reinforcing material is commercially available in the form of rolls or spools of these materials.

Born filaments, graphite tow, filaments from lithium and other grown whisker crystals can be employed. In addition, metal wire may even be interspersed with some of the filament materials in the event that it is desired to add some type of metallic body to the final article. In the actual formation of the reinforced composite articles, a plurality of different reinforcing materials may be employed as hereinafter described in more detail. The exact composition of the final articles will be predicated on the intended use, the size and strength requirements and like factors.

These various reinforcing materials, mentioned above, may be impregnated at the site of the apparatus A, or they may be commercially purchased in pre-impregnated form. In many cases, it may be desirable to impregnate the reinforcing materials during the actual operation in order to obtain better control over the resin impregnation.

The resin matrix impregnating member may be any suitable type of resin matrix impregnator, such as the dip tank which merely contains a liquid resin material, as described above. Otherwise, a resin matrix impregnating canister could also be employed in which the resin matrix material is forceably impregnated into the reinforcing material by pressure, or sonic energy or other forms of driving force.

Several commercially available resin matrix compositions can be used for impregnating the reinforcing materials. The matrix should be capable at some stage of the process, of being liquified and softened for a period of time, and also should be able to flow around the filaments forming the strands. In addition, the matrix should be capable of achieving a rigid state of complete polymerization to become a rigid solid member with the reinforcing material and should also possess the ability to adhere to the reinforced material. Some of the suitable thermoplastic resin matrix materials which can be employed for impregnating the reinforcing materials are resins such as polypropylene, polcarbonates, and the like. In addition, some thermosetting resins, such as phenolics, epoxy type resins and various polyesters may also be used. These polyesters are preferably the condensation products from phthalic anhydride, maleic anhydride, ethylene or propylene glycols with a styrene or diallyl phthalate monomer. Generally, the thermosetting resins should be capable of being fused into an insoluble, non-heat softening mass upon application of heat or similar method of triggering the catalytic system. Other binders which may be used are hard waxes, eutectic ceramics, eutectic materials, synthetic rubbers and the like.

In many cases, it may be desirable to introduce a particulate matter into the resin matrix and reinforcing material composite. This particulate matter is desirable in some cases in order to provide the desired reinforcing characteristics and even asthetic appearance. The particulate matter can also be used as an economizer in that it reduces the necessary amount of the more costly resin matrix and/or reinforcing material used to make a product. There are a number of particulate materials which can be employed in the formation of the articles of the present invention and include, for example, sand, particulate silicon, etc.

The apparatus also includes the device or mechanism for forming, the plugs, or so-called "inserts", which are used in the reinforced plastic composite articles that are produced. The source of the plug material 18 may exist in the form of a pair of spools 66 (FIGS. 2A and 3) containing the bulk molding compound thereon in the form of a so-called "rope" of this material. These spools 66 are mounted for rotation on vertically disposed shafts 68 so that a rope of bulk molding material 70 may be unwound therefrom, in the manner as illustrated in FIGS. 2A and 3. The combination of the source 18, the core-line 20 as well as the forming system 16, the plug pre-molding dies 24 and the mold release 22 can be considered as the plug generating mechanism 72. Further, in the present invention, it can be observed that there are two continuous ropes 70 of the bulk molding compound and hence, there are essentially dual stations or dual processing streams provided by the plug generating mechanism such that two continuous supplies of plugs or streams of so-called inserts are provided. However, for simplicity only one of these plug generating mechanisms is described in detail herein, with the other being substantially similar in construction and operation.

The plug-generating mechanism 72 is designed to form a plurality of individual space-apart plugs which are carried on the continuous core line or so-called connecting cord 20. By further reference to FIG. 2A, it can be observed that the various plugs on the connecting cord 20 are introduced into the stream of binder impregnated filament containing reinforcing material 65. In this way, the continuous stream of binder impregnated reinforcing material, along with the plugs on the connecting cord, are introduced into a die cavity hereinafter described. In this case, the plugs of material would be spaced apart on the connecting cord 20 and the strands of reinforcing material would envelope the plugs.

The plug-generating mechanism 72 generally comprises a main supporting table or frame 74. Mounted on the upper surface of the frame 74 for each plug forming station is the pair of material supply spools 66 which carry a supply of plug-forming material and which dispenses same and thereby provides a continuous "rope" 70 of this material, in the manner as illustrated in FIGS. 2B and 3. The continuous string or so-called "rope" of plug-forming material is preferably a bulk molding material which is capable of being shaped into plugs of the desired size and shape.

The bulk molding compound may be a polyester material which is somewhat moldable and may contain fiber reinforcing material, as for example, chopped glass, in order to have a putty-like consistency. Each plug which is formed is provided with sufficient material so that the plug will roughly contain the same volume of material as is needed to fill an enlarged portion in a die cavity, as hereinafter described.

The rope of bulk molding material is introduced into a pre-forming roller mechanism 80 (FIG. 3) which functions as a type of shaping and straightening mechanism for initially straightening the rope of bulk molding material. The pre-forming roller mechanism 80 comprises a pair of vertically disposed rollers 82 which engage the opposed sides of the rope. Further, the rope of material is immediately thereafter trained between a pair of rollers 84 which are horizontally disposed, that is, they are adapted for rotation about axes in generally horizontal planes. It can be observed that the two pairs of rollers 82 and 84 generally shape the rope of bulk molding material both horizontally and vertically.

The rollers 82 are mounted on pins 86 which are suitably retained on a housing 88, the latter being disposed on the upper surface of the frame 74. In like manner, the rollers 84 are supported on roller shafts 90 which are also mounted on the frame 88. It can also be observed that the rollers 84 have relatively deep groves so as to cause this initial shaping of the rope of bulk molding material as it passes between the two rollers 84.

Located at a downstream position to receive the rope of bulk molding compound are a pair of shaping or forming rollers 92 and 94, as shown. The roller 94, which is the lower of the rollers, has a peripherally extending rim 96 which extends within a groove 98 formed in the upper of the rollers 92. However, it can be observed that the rim 96 has a thickness somewhat less than the overall width of the groove 98. As a result of this construction, when the bulk molding material passes between the two rollers 92 and 94, the rim 96 and the groove 98 impart somewhat of an inverted U-shaped cross-section to the bulk molding compound, as more fully illustrated in FIG. 5.

The rollers 92 and 94 are mounted on a pair of horizontally extending roller shafts 100 and 102 respectively, which each journaled in a pair of enlarged upstanding side walls 89 forming part of the housing 88.

The formed rope of bulk molding material is then carried by the continuous cord 20, which is provided from a source (not shown) on the frame, and carried from such source through a rising tube 103. This source may adopt the form of a spool of the continuous cord which is unwound from the spool during the operation of the apparatus, and the feeding of the reinforcing material. By further reference to FIG. 3 it can be seen that a receiving block or so-called shoe 104 is provided for the rope of material 78 to be draped over the cord 20. In this way when the somewhat U-shaped rope of bulk molding material is disposed over the cord 20, this cord fits upwardly within the trough of the rope 70 of bulk molding material.

A cutting device 106 is also provided with the apparatus and includes a pair of notched cutting blades 108, as shown in FIGS. 2A, 3 and 6. These cutting blades 108 are mounted for pivotal or rotatable movement on shafts 107 which are, in turn, journaled in a housing 109. The cutting blades 108 are provided with outer cutting edges 110 and each have a notch 111 to receive the cord 20. The blades 108 are located to receive the rope of bulk molding material and cut the bulk molding material into discrete sections, without cutting the continuous cord 20.

The notches 111 in turn receive the cord 20 when the cutting blades 108 pivot toward each other to cut the bulk molding compound and the notches allow the cord 20 to remain unsevered. In this way, the cord will remain continuous in the stream of filamentary material throughout the apparatus, but the bulk molding compound will be in discrete sections. Further, these various discrete sections will actually constitute plugs 112 which form part of the final reinforced plastic articles after having been molded to a desired shape, as hereinafter described in more detail.

An advancing mechanism 114, which is more fully illustrated in FIG. 3, is provided for moving the successive plugs of bulk molding material through the apparatus at a desired rate. The advancing mechanism comprises a crank arm 116 having a threaded section 117 and which is connected to the shaft 102. This crank arm 116 is designed to cause rotation of the lower roller 94.

Moreover, the shaft 102 is caused to rotate when the crank arm is moved from an initial position, represented by the axis line 118, to the position as illustrated in solid lines in FIG. 3. The piston of a pneumatically operated cylinder 120 is connected to a coupling 121 affixed to the crank arm 116 to cause movement of the same from the axis line 118 to the position as illustrated in FIG. 3 and back to the axis line 118. The cylinder 120 is connected to a suitable control system in order to control the timing of the movement of the crank arm 116.

The cylinder 120 is pneumatically operated, as aforesaid and forms part of a pneumatic control and timing system. Thus, other drive piston cylinder arrangements, hereinafter described, are also pneumatically operated. It should be understood that hydraulic drive systems and the like could be employed in place of or in addition to the pneumatic system.

A type of ratchet mechanism (not shown) would be located on or associated with the shaft 102 to permit rotation in only one direction, namely the clockwise direction, reference being made to FIG. 3. Thus, as the piston of the cylinder 120 is extended so that the crank arm 116 reaches the position as shown in FIG. 3, the shaft 102 and wheel 94 will be rotated. However, when the piston of the cylinder 120 is retracted, the shaft 102 and wheel 94 will not be rotated.

The coupling 121 is threadedly mounted on the crank arm 116 for adjustable movement thereon. By varying the position of the coupling 121 it is possible to control the movement of the crank arm 116 which affects movement of the stream of material. In this way, it is possible to control the movement of the various individual discrete sections and consequently, the spacing and length of the individual sections, and hence the size of the plugs, by a relatively simple timing mechanism.

The individual discrete sections of plug-forming material are shaped, and more specifically, molded into a desired shape by means of the plug pre-molding dies 24, schematically shown in FIG. 1. These plug molding dies actually form part of a cold die mechanism as hereinafter described in more detail and which is also more fully illustrated in FIGS. 2A and 7 and 8. The die mechanism 24 is often referred to as a "briquetting" die mechanism inasmuch as the various sections of plug-forming material or plugs 112 are molded into a shape which sometimes appear similar to that of a briquet. Further, this die mechanism 24 is essentially a cold molding die mechanism in that little or no heat is required to mold the various plugs of material into the desired shape. The plug-forming material is somewhat putty-like in substance so that it can be molded into the desired shape with only some pressure and which substance will thereafter essentially retain that shape. The shape of the pre-molded plug is similar to that in the final article although, final molding will occur as hereinafter described in more detail.

The cold die mechanism 24 generally comprises a main frame 122 having a pair of laterally spaced apart longitudinally extending carriage supporting rods 124 for supporting a longitudinally reciprocatable carriage 126, as shown in FIGS. 7 and 8. The carriage 126 is generally comprised of a main frame 128 having a bottom plate structure 130. Secured to the bottom plate structure 130 is an L-shaped bracket 132 which is connected to a puller rod 134 for movement therewith. This puller rod 134 is bolted to the bracket means 132 by means of a pair of nuts 136 and an extension 138 is secured thereto for connection to another portion of the puller rod. The puller rod 134 extends generally longitudinally through the plug-forming device and is suitably supported thereon, as for example, by pairs of spaced apart upper and lower rollers (not shown).

The puller rod 134 is pulled back and forth in a reciprocative manner coordinated to the timing of the movement of the plugs through the apparatus. The exact shape of the plugs which have been formed and shaped in the pre-molding dies 24 will depend upon the overall size and shape of the final article to be produced. In one embodiment of the present invention, hammer handles may be produced as illustrated in FIGS. 19–21, and which are hereinafter described in more detail. These hammer handles, for example, may have one portion with a larger cross-sectional volume and a different cross-sectional shape than other portions thereof.

After formation of the bulk molding plugs 112, the binder impregnated reinforcing strands are brought into contact with the plugs in a strand dispersing or spreading device 190, as shown in FIGS. 2A and 9. The strands are disposed about the plugs such that the plugs are essentially completely enveloped by the binder impregnated strands. Further, it should be observed in FIG. 2A that there are two continuous cords 20 containing the trains of plugs 112. For this purpose, the strand dispersing device 190 would be designed so that two individually cylindrically shaped chambers are provided so that the strands may be divided for each of the two devices and separately wound about the individual plugs on each of the two continuous cords. It should also be understood in conjunction with the present invention that more than two individual stations providing individual plug containing cords could be employed.

The strand dispersing device 190 is more fully illustrated in FIG. 9 of the drawings and generally comprises an outer housing 192 which is longitudinally bored for each station to form a receiving tube 194. Upper and lower guide rollers 196 are also provided for separating and causing strands to engage the upper and lower surfaces of the plugs 112 contained on the cord 20. Further, vertically disposed side rollers 198 are also provided for causing the strands to engage the sides of the plugs 112 carried on the cord 20. This arrangement of four rollers has been found to be effective in apportioning the strands to essentially cause the strands to completely surround and envelope the plugs. Additional roller arrangements could be employed if desired. Alternatively carding plates could be substituted for the rollers.

After the strands have been properly and evenly accumulated around each of the plugs 112 on the connecting cord 20, the cord is moved along with the plugs and strands into a film feed and fold device 26, which is more fully illustrated in FIGS. 10, 11 and 12 of the drawings. Here again, two individual stations have been illustrated in FIGS. 2A, 10 and 11 for purposes of accommodating the two individual cords containing the strand wrapped plugs. Each film feed and fold device 26 comprises an individual horizontally disposed receiving roller 202 journaled in bearing blocks 204, as more fully illustrated in FIGS. 10 and 11 of the drawings. A film supply 28 is also provided, as more fully illustrated in FIG. 11 of the drawings and generally comprises rolls 206 with each containing and dispensing a uniaxially shrinkable film 208. Here again, two such rolls 206 providing individual continuous sheets 208 have been provided, with one for each of the individual stations.

At each station, the continuous sheet of the film 208 is trained about the roller 202 for purposes of wraping the strand enclosed plugs in the shrinkable film, as hereinafter described in more detail. A cylindrically shaped forming tube 200 (often referred to as a "forming chute") is provided for completely wrapping the sheet, longitudinally, about the strand enclosed plugs. A guide sleeve 216 surrounds the forming tube 200 and has a tapered rearward end 217 to guide and wrap the film about the strand enclosed plugs. Initially, the plugs on the core-line 20 pass through the interior of the tube 200 and the film 208 surrounds the tube 200. In this way, the plugs of bulk molding material are not affected by a film sealing operation as hereinafter described.

One preferred form of wrapping tube 201 which may be employed is illustrated in the top plan view of FIG. 12. This wrapping tube 201 is funnel-like and is curved about its longitudinal axis and preferably is initially formed from a flat metal sheet. The radius of curvature decreases progressively along the longitudinal axis from its inlet end 212 to form an exit aperture or outlet 214. Thus, the left-hand end of the tube, reference being made to FIG. 12, would only be slightly curved, whereas the right-hand end would be completely curved upwardly and inwardly so that the tube forms a surface of revolution. The circumference and radius decrease with progression along the longitudinal axis thereof. However, if desired, the tube 200 can be formed with a generally constant radius in the manner as illustrated in FIG. 10 of the drawings. As the plastic sheet is introduced into the tube, the longitudinal edges are overlapped upon one another so that the strand enclosed plugs are completely enveloped within the sheet itself.

Located downstream from the film feeding and folding device 26 is an ultrasonic film welding device 30 which uses the forming tube 200 as one of the electrodes, in the manner as illustrated in FIG. 11. An ultrasonic welder 218 having an ultrasonic generator 220 is provided for imparting a welding energy to the overlapping longitudinal edges of the uniaxially oriented sheet. The tube 216 is provided with a longitudinal slot 222 on its upper surface to accommodate a welding tip 224 on the ultrasonic welding electrode 216. As the sealed film passes beyond the right-hand end of the tube 16 it will completely surround and completely wrap and enclose the strand wrapped plugs. Special provisions would be made for another electrical wheel using the forming chute of FIG. 12.

Actuation of the ultrasonic welding device will not have any appreciable effect on the heat curable binder, such as the resin matrix. Furthermore, it can be observed by means of the above identified construction, that as the strand enclosed plugs are pulled through the forming tube 200, any air entrained between the strands will be forced rearwardly as the plug enclosed strands are pulled through the discharge end 214. Further, if desired, it is possible to utilize a vacuum housing surrounding the entire structure for wrapping the film about the strand enclosed plugs and thereafter sealing the same. One suitable mechanism for wrapping and sealing is described in U.S. Pat. No. 3,650,864 dated Mar. 21, 1972 to William B. Goldsworthy and in U.S. Pat. No. 3,654,028 dated Apr. 4, 1972 to William B. Goldsworthy as well as in U.S. Pat. No. 3,576,705 dated Apr. 27, 1971 to William B. Goldsworthy.

A number of plastic films may be used in the present invention including several of the vinyl copolymers, such as vinylidiene chloride. Other films which may be employed in connection with the present invention are various thermoplastic polymers and copolymers, Mylar films, polyethelene, some of the polyvinyl alcohols, etc. The design or surface finish of the film may be suitably transferred to the article as produced when the film is removed after curing of the composite article, as hereinafter described in more detail. Further, embossing on the surface of the film can also be imparted to the surface of the composite. The particular film employed is not critical although it must be uniaxially oriented so that it will shrink only in one direction. In the embodiment as illustrated, the film will not shrink longitudinally, but only in a direction surrounding the composite such that it tightly encloses the strand wrapped plugs.

It can also be observed that by enclosing the binder impregnated strands in the plastic film, any catalyst in the binder is prevented from evaporating and further, any oxidation of the catalyst is inhibited since the matrix does not come in contact with the air.

After the strand enclosed plugs have been completely wrapped by the plastic film and sealed in the film, the continuous cord 20 carrying the strand enclosed plugs is moved into the pre-curer 34. This pre-curer is more fully illustrated in FIG. 2B and may adopt the form of a dielectric energy pre-curer such as for example, a radio frequency pre-curer 226. This radio frequency pre-curer 226 includes a radio frequency generator 228 along with electrode assembly 230 capable of being disposed in close contact to the film wrapped strand enclosed plugs for initiating a cure of the binder such as the resin matrix impregnated within the filament containing strands. The generator 228 would include an internal resonance cavity and would be properly shielded.

By utilizing both the pre-heating or pre-curing which is provided by the radio frequency pre-curer 226, and the final heting environment, as hereinafter described, an augmented cure, similar to that described in U.S. Pat. No. 3,556,888 dated Jan. 19, 1971 to William Brandt Goldsworthy, can be achieved. This augmented curing of a resin matrix impregnated reinforcing material permits a complete cure of the resin matrix without overcuring and also enables substantially higher running rates. In addition, this form of augumented curing significantly increases the scope of raw materials which can be used to form the end product.

The dielectric pre-heating, or pre-curing mechanism of the present invention will operate with both radio frequency energy and with microwave energy. The radio frequency generator preferably generates energy within a frequency range of approximately 13 megahertz to approximately 100 megahertz, and preferably within the range of approximately 13 megahertz to approximately 82 megahertz. The microwave generator preferably generates energy within the range of approximately 920 megahertz to approximately 25,000 megahertz.

While the theory of microwave and radio frequency curing is not completly understood, it is believed that the curing, in part, occurs by molecular interaction, and particullarly, by molecular friction. The molecules of the resin have a polar structure, such that when an electrical field is introduced across the molecules of the resin, the molecules will tend to orient in the direction of the field. After release of the field, the molecules will attempt to re-orient back to their original direction. This action is believed to create a frictional effect between the molecules and thereby produce heat in the resin matrix.

Furthermore, the employment of dielectric pre-heating is also believed to be significant in the present invention in that this type of pre-heating enables the initiation of the cure at the center of the mass. In this respect the pre-heating may not generate a cure or even significantly start a pre-cure as such, since the amount of heat applied is less than that required to cure the resin matrix. However, in the case of the polyesters, for example, a pre-cure may actually be initiated. Therefore the term "pre-heating" also encompasses pre-curing in certain compositions. Inasmuch as the thermal conductivity of the resin-fiber composite allows the surface heat to dissipate, the surface of the mass will cool slightly with respect to the remainder thereof. Accordingly, the center of the mass achieves a given temperature prior to the surface of the mass. In this manner, the pre-heating or pre-curing will actually begin from the center of the mass. Accordingly, any out gasing of air which may be entrained in the composite does not create any fissures or cracks.

The ability of the resin matrix to accept the electrical energy is dependent upon the electrical loss tangent of the resin system. Accordingly, the resins are selected with a proper electrical loss tangent for use in the dielectric pre-heating system of the present invention. Generally, the thermosetting resins mentioned above are preferred since they all have the proper electrical loss tangent for use in this system. The resins all have a high electrical loss tangent in the monomeric form, and a low electrical loss tangent in the polymeric form. The electrical loss tangent is actually affected by the dielectric strength of the material, and the heat dissipation factor of the material. In this manner, the pre-heating or pre-curing process is self limiting, so that the resin matrix essentially cannot be overcured.

After a pre-cure of the resin matrix has been initiated, the film enclosed strand wrapped plugs are then introduced into the chain die and drive device 36 which is more fully illustrated in FIG. 2B and in FIGS. 13–18 of the drawings. This chain die and drive device, hereinafter described in more detail, actually serves at least three major functions in the apparatus and associated method and which are (1) to drive the stream or streams of film wrapped strand enclosed plugs on the continuous cord through the apparatus and, (2) to apply a final shape to the composites in a final molding operation and (3) apply a final heating or curing radiation to the composites of film wrapped strand enclosed plugs The chain die and drive device 36 generally comprises an initial die transfer mechanism 232 which includes a main supporting structure 234 for supporting a laterally shiftable die receiving table 236. This die receiving table 236 is designed to carry a die assembly 238, hereinafter described in more detail, from a die assembly return conveyor 240 to an initial starting position as illustrated in FIGS. 14A ad 15A. The die supporting table 236 is laterally shiftable on a pair of spaced apart laterally extending stationary guide blocks 242 forming part of the structure 234. The table is also provided with downwardly extending guides 244 for engaging the guide blocks 242. Further, a depending lug 246 on the underside of the table 236 is engagable with the piston of a pneumatic piston-cylinder arrangement 248 for purposes of laterally shifting the table from a positition in alignment with the return conveyor 240 back to a position where the table is in a feed path for enabling movement of the die assemblies 238 into the chain and die drive mechanism 36, as hereinafter described.

A plurality of die assemblies 238 are used with the apparatus and each of the die assemblies 238 are located in aligned and successive relationship, as illustrated in FIGS. 13A and 13B, when they pass through the final chain die and drive assembly. Preferably each die assembly is located in abutting relationship with the next forwardmost and the next rearwardmost die assembly.

Each such die assembly 238 is more fully illustrated in FIGS. 16–18 and is generally comprised of an upper die 250 and a lower die 252 each of which are removeably mounted on upper and lower die mounting plates 251 and 253, respectively. Removable mounting of the dies to the associated die mounting plates enables easy interchangeability of the dies. Any means for mounting the dies to the die plates, e.g. movable bolts, or the like, may be employed. Provided on one longitudinal side of and being integral with the upper and lower outwardly extending mounting plates 251 and 253 are upper and lower guide blocks 254 and 256, respectively. Guide pins 257 are mounted in and extend upwardly from the lower guide blocks 256 and are received in aligned apertures in the upper guide block 254. The upper and lower mounting plates 251 and 251, respectively, are thus connected at one of their outer longitudinal margins by the vertically disposed pins 257 which permit vertical shiftable movement therebetween. Springs 258 are disposed between the guide pins 257 and extend between the die plates 251 and 253 to bias the dies 250 and 252 apart, that is to the opened position, as illustrated in FIG. 17. Positionally adjustable bolts 259 which engage one end of the springs 258 serve as a tension adjusting means. Thus, the bolts 259 are capable of being turned to increase or reduce the compression force of the springs 258.

The upper die mounting plate 251 and the lower die mounting plate 253 are each provided with forward cam follower rollers 260 which ride in a recess or slot 261 formed in a guide plate or so-called "cam plate" 262 in the die expansion section, as shown in FIG. 17. The upper mounting plate 251 is also provided with cam follower rollers 260 which ride in a recess or track 261 formed in an opposed cam plate 263. In like manner, the lower die mounting plate 253 carries cam follower rollers 264 which similarily ride within a recess or track 266 formed in the guide plate 26. In addition, the mounting plate 253 is provided with rollers 264 which ride within a recess or track 266 formed in the guide plate 263, also as shown in FIG. 17. These cam plates are located in the die expansion section as stated, for reasons which will presently more fully appear.

The opposed flat faces of the upper die 250 and the lower die 252 would similarily are provided with recessed portions or die cavities 267 and 267, respectively, in order to receive the strand enclosed plug composites. The size and shape of the die cavities will vary from die to die depending on the desired size and shape of the overall reinforced plastic composite articles to be produced.

The die plates 251 and 253 and the associated dies 250 and 252, respectively, which constitute part of a final mold are capable of being opened to the position as illustrated in FIG. 18. They are also capable of being shifted to a closed position, in the manner as illustrated in FIGS. 13A and 13B and in FIGS. 16, 17 and 19. When in the closed position, a film wrapped strand enclosed plug contained therein will be finally cured and simultaneously finally shaped in the mold cavities.

When each die assembly 238 which has been carried back to the initial starting position by the return conveyor 240 and which is laterally shifted to the molding path by the initial die transfer assembly 232, that die assembly is then in a position to be moved along the molding path. In this respect, the term "molding path" is that path which is effectively in alignment with the stream of film wrapped strand enclosed plugs contained on the cord and not the path for the return of the die assemblies.

After being moved to the initial starting position in the molding path, a somewhat C-shaped advancing structure in the form of a bracket 268 is provided for moving the die assembly while opened, from the initial starting position to a position where it is capable of being moved through a final molding path, designated by reference numeral 270 in FIG. 13A and in FIG. 14A. It can be observed that the C-shaped advancing bracket 268 is initially located in the position as illustrated in the dashed lines in FIG. 13A and is advanced to the position as illustrated in the solid lines of FIG. 13A and thus moves the die assembly 238 by an equivalent distance in order to move the same into the molding path and enable movement through the apparatus.

The C-shaped advancing bracket 268 includes a horizontally disposed plate 272 and mounting on its underside are a pair of guide plates 274 which carry guide sleeves 276 and the latter of which are disposed about guide rods 278. In this way, the C-shaped advancing bracket 268 is aligned in its movement with the molding path. A pneumatic cylinder-piston arrangement 280 is provided for shifting the C-shaped advancing structure or bracket 268 from the initial position as shown in the dashed lines of FIG. 13A to the position as shown in the solid lines of FIG. 13A and back to the initial position. The piston 282 of this pneumatic cylinder-piston arrangment is connected to a downwardly depending leg 284 on the horizontally disposed plate 272 for causing the movement of this C-shaped advancing bracket.

As each die assembly is moved forwardly in the molding path 270 it is first moved into an initial die compression station 286 by means of the pneumatically operated C-shaped frame 268. The first die compression section, often referred to as a "hold down" section 286 is comprised of an upper track supporting housing 287 and lower track supporting housing 288. The upper track supporting housing preferably comprises a pair of transversely spaced apart plates 287a and 287b, as show in FIGS. 16 and 17. The lower track supporting housing 288 also comprises a pair of transversely spaced apart plates 288a and 288b. Each of the aforesaid plates 287a, 287b, 288a and 288b have spaced apart upper and lower edges which are connected by arcuate end edges. Trained about the periphery, e.g. the upper and lower edges and arcuate end edges of the housing 287 and 288 are continuous tracks 290 and 291, as for example, in the form of continuous chains which are capable of engaging the respective upper and lower surfaces of the die mounting plates 251 and 253, respectively.

Each of the track supporting houses 287 and 288 are held by a somewhat U-shaped frame 292 which is, in turn, pivotally mounted on a link 294 through a pivot pin 295. The pivot 295 is also pivotally secured to a somewhat triangularly shaped plate 296 which is hereinafter discussed in more detail. Each link 294 is operable through a linkage mechanism 298 which is, in turn, controlled through a pneumatic cylinder 300.

It can be observed that when the upper pneumatic cylinder 300 is unactuated, or otherwise is actuated in such manner that the piston 301 is retracted, the linkage 298 will cause the entire track supporting housing 288 and the continuous chain or track 290 thereon to be biased so that the left-hand end, reference being made to FIG. 13A is biased upwardly and out of engagment with the upper plate 251 of the die assembly 238. In like manner, when the lower pneumatic cylinder 300 is unactuated, or otherwise is actuated to retract the piston 301 thereof, it will similarily cause the lower track supporting housing 288 to be biased about the pivot pin 295 to a position where it is out of engagement with the lower plate 251 of the die assembly 238.

The housings 287 and 288 are initially maintained in the opened or separated position due to the fact that the die assembly is initially open, such as in the position as illustrated in FIGS. 14A and 18, when entering the molding path. Thereafter, in order to be moved through the molding path, and as the first step in the molding path, the pneumatic cylinders 300 are actuated to cause the pistons to extend and which thereby return the housing 287 and 288 to the position as illustrated in FIG. 13A, and thereby compress the die assembly, that is move the upper and lower dies 250 and 252 together.

A pulling mechanism 302 is also provided for moving the various aligned die assemblies 238 through the molding path 270. The pulling mechanism 302 generally comprises a pneumatic piston-cylinder arrangement (only the piston 304 being illustrated, as in FIG. 13A) and which is connected to a lever arm 306 having a upwardly projecting tab or so-called "dog" 308 at its left-hand end. By further reference to FIG. 13A, it can be observed that the dog 308 which, in effect, operates as a cam will fit within a recess 310 formed in the underside of the lower die mounting plate 253 of each die assembly 238 as they are sequentially moved into the molding path 270. The lever arm 306 is pivotally mounted to the piston 304 by means of pivot pin 312. In this way, the dog 308 will ride along the under surface of the lower die mounting plate 253 of the die assembly 238 until such time as it reaches the recess 310 at which point in time it is biased upwardly therein.

When the piston 304 is retracted within the cylinder forming part of that piston-cylinder assembly 302, the first or initial die assembly 238 is pulled into the molding path 270, as for example, to the right, as illustrated in FIGS. 13A and 13B. As this occurs, the die assembly 238 which has been shifted to the closed or compressed position then enters a second or main die compression section 314. This die compression section 314 is comprised of upper and lower housings 316 and 318 and each of these housing 316 and 318 are comprised of a pair of spaced apart plates, in the same manner as the housings 287 and 288. The upper housing 316 is pivotally mounted to be adjustable and is referred to as "floating". The lower housing 318 is fixed on a mounting member 317.

The upper and lower housings 316 and 318 are comprised of upper and lower edges and which are connected by arcuate end edges. Each of the pairs of plates of each of the housings 316 and 318 carry on their peripheral surface, e.g. around the upper and lower edges and arcuate end edges, continuous chains 320 and 322, respectively. The chain 322 on the lower plate 318 is adapted to engage the lower surfaces of the lower die assembly forming part of each of the the die mounting plates 253. In this way, each of the sequentially located and abutting die assemblies 238 are carried along and through the apparatus.

The upper housing 316 is mounted on a pair of links 324 and 326 which are pivotally secured to generally downwardly extending brackets 328 extending generally downwardly from a upper supporting structure 330. The links 324 and 326 are respectively secured to the brackets 328 by pivot pins 332. The right-hand link, reference to be made to FIG. 13A, is secured directly to the housing 316 by means of a pivot pin 334. The left-hand end of the housing 316 is pivotally secured through a pivot pin 336 to the triangular plate 296, which is, in turn, mounted on a pivot pin 338 at the lower end of the link 324.

In accordance with the above construction, the housing 316 and the chains 320 trained therearound can be shifted slightly upwardly and downwardly with respect to the upper surface of the upper die 250 forming part of the die assembly 238. For this purpose, a pneumatic cylinder 339 is provided and the piston 341 of this hydraulic cylinder is pivotally connected to the housing 316. Thus, when the piston 341 is extended, the housing 316 and hence the continuous chain 320 is biased into engagment with the upper surface of the upper die assembly with greater force. In this way, the desired amount of pressure or compression can be maintained on each of these successive die assemblies 238 as they pass through the molding path 270.

The apparatus may include one or more main die compression sections 314 depending upon the overall length of the apparatus and the number of die assemblies which are being processed in the molding path.

The apparatus is also provided with a final die compression section 340, which is more fully illustrated in FIG. 13B. The final die compression section 340 is similar to the main die compression section 314, and comprises a pair of upper and lower housings or frames 342 and 344, with each being comprised of a pair of transversly spaced apart plates 343 and 345. Each plate 343 and 345 has a continuous chain 346 and 348, respectively trained therearound. The lower frame 344 may be fixed and the upper frame 342 may be pivotally mounted with a link system 350 similar to that useed with the main drive section. A cylinder 339 and piston 341 arrangement is also employed with the final compression section as with the main compression section.

The continuous chains 346 and 348 on either one or both of the upper and lower housings 342 and 344 are driven. A drive mechanism 352 is provided for this purpose. The drive mechanism 352 includes a drive motor 354, such as an electric motor in combination with a plurality of idler sprockets 356 and 358 and 360. A drive chain 362 is trained around these various idler rollers 356, 358 and 360. The drive chain 362 is also adapted to cause rotatable movement of the drive chains 346 and 348. The drive mechanism 352 is also provided with a tension mechanism 366 for adjusting the tension on the drive chain 362.

During passage through the molding path, a final heat or curing radiation is also applied to the die assemblies 238 and hence to the composites of film wrapped strand enclosed plugs located in the die cavities in each of the die assemblies. This curing radiation may also be a dielectric energy as mentioned above or it may be in the form of inductive heating, or the like. For this purpose, the electrically operable inductive heaters, as for example, cartridge heaters 368 may be located within and extending between the pairs of plates of each of the housings 316 and 318. The amount of heat provided by the cartridge heater or other final curing mechanism would be sufficient so as to advance the pre-cure to the final or C-stage whereby the resin matrix impregnated within the reinforcing strands and the bulk molding plugs themselves are finally cured to a point where they are relatively hard and thereby form the reinforced plastic articles.

The rate of rotation of the drive chain 362 and hence of the continuous drive chains 346 and 348 would be coordinated with the movement of the various other sections of the apparatus, as for example, the rate of movement of the plugs and reinforced plastic strands through the apparatus. Any conventional control system could be employed for this purpose and is therefor neither illustrated nor described in detail herein. Further, the operator may also exercise and over-ride any automatic control with manually operable controls provided on the control console 44.

At the exit end of the molding path 270 is located a die assembly expansion section 370, as more fully illustrated in FIGS. 13B and 15B. The die assembly expansion section 370 includes the pair of spaced apart cam plates 262 and 263 with each having the initial die assembly roller receiving tracks 261 and 266. The rearwardly presented cam follow rollers 260 on each of the die mounting plates 251 and 253 are spaced laterally outwardly from the forwardly presented rollers 260 on such mounting plates 251 and 253, as shown in FIG. 15B. Thus, during the die expansion operation, as hereinafter described, the forwardly presented rollers will ride in different sets of tracks than the rearwardly presented rollrs. This enables convenient tilting movement of the portion of the die mounting plates simultaneously with forward movement thereof. The initial roller receiving tracks 261 and 266 have upwardly and downwardly diverging sections 372 and 374, respectively, which again merge into horizontally disposed sections 376 and 378. The upwardly and downwardly diverging sections 372 and 374 accommodate the rearward rollers 260 and 266. A forwardly presented set of upwardly and downwardly diverging track sections 380 and 382 will accommodate the forwardly presented rollers 260 and 266 and which again merges into its own set of further spaced apart track sections. When the cam rollers are moved along the upwardly and downwardly along the inclined tracks 378 and 380 they will cause the upper and lower die assembly plates 251 and 253 to separate and thereby cause separation of the dies 250 and 252 so that the die assembly is opened, as illustrated at the right-hand end of FIG. 13B.

A final die assembly drive device 386 is also provided, as bet seen in FIGS. 13B and 15B, and includes a housing 388 having rollers 390 moveable along a trackway 392. The housing 388 is shiftable longitudinally beneath the molding path by means of a pneumatic cylinder arrangement 394. At its upper end, the drive housing 388 carries a pivotal link or so-called "dog" 396 and which is adapted to engage and fit within the recesses 310 on the underside of each of the die assembly plates 256. In this way, movement of the final die assembly drive device to the right, reference being made to FIGS. 13B and 15B, will cause movement of each of the die assemblies through the die assembly expansion section 370 and to a final die transfer section 398.

The final die transfer station 398 is designed to shift the die assembly 238 laterally away from the molding path 270 and into the path of the return conveyor 240 so that the die assembly may again be returned to the beginning of the molding path 270 and used again. The die transfer section 398 generally comprise a laterally shiftable table 400 which is again provided with guides 402 on its underside for receiving guide posts or guide rods 404. Further, a pneumatic piston-cylinder arrangement 406 is adapted for connection to a tab 408 on the underside of the plate 400 and thereby is adapted to move the plate 400 and hence the die assembly 238 carried thereon laterally away from the molding path 270 and into alignment with the return conveyor 240. Again, the actuation of the pneumatic piston-cylinder arrangement 406 is coordinated with the movement of the die assemblies 238 through the apparatus.

By reference to FIG. 15B, it can be observed that the transfer table 400 moves the opened die assembly 238 into alignment with, but not on the conveyor 240. Thus, the assembly is still forwardly spaced from the conveyor 240. A pneumatic piston-cylinder arrangement 409 is actuated to effectively push the die assemblies 238 onto the return conveyor 240.

The die assembly return conveyor 240 is more fully illustrated in FIGS. 14A and 14B and FIGS. 15A and 15B and comprises a conveyor belt 410 rotatable in a counter-clockwise direction along a supporting housing 412. This supporting housing 412 may be, in turn, supported on a plurality of upstanding posts 414. At its left-hand end, the conveyor belt 410, when rotated, will deliver each of the die assemblies 238 back to the initial position as illustrated. Further, a suitable electric motor 415 or other form of drive mechanism is provided for rotating the conveyor belt 410. Again, the conveyor belt 410 may also adopt the form of a continuous drive chain.

As indicated previously, after the die assemblies are moved out of the molding path, the bulk molding plugs and the reinforced plastic strands completely hardened into a unitary composite article which has the desired size and shape represent the final composite article. This is true even though that final article may require additional hardware or esthetic elements to be added thereto for purposes of utility or appearance. It is necessary to remove the film which was wrapped about the composite article during the processing thereof. For this purpose, a flash removal device 38 and a film removal device 40 are employed, and which are more fully illustrated in FIG. 2B of the drawings. For this purpose, the flash removal device and the film removal device could be combined as a unitary structure and designated by reference numeral 420. The flash removal device is designed to remove excess edges which result from the die parting line. Thus, on each of the opposite sides of the continuous chain of articles are produced, slight edge flash may exist. These oppositely disposed edges may be conveniently removed by means of cutting blades (not shown) or the like. The film removal portion of the device may also adopt the form of a cutting blade which is designed to cut only the film itself and not the reinforced plastic composite article thus produced and encased in the film.

For purposes of withdrawing the excess flash and the removed film, a vaccum blower 422 along with the necessary vacuum piping 424 is employed to effectively suck away the removed materials. At this point in the process, a continuous chain of reinforced plastic composite articles carried on the continuous cord exit the device 420.

Located downstream from the combination flash removal and film removal structure 420 is a so-called "flying cut-off saw" 426 which is essentially conventional in its construction. The flying cut-off saw 426 includes a saw 428 mounted on a laterally shiftable carriage 430. Thus, as the continuous stream of reinforced plastic composite articles are moved through the saw, the saw will travel laterally on the carriage 430 and sever the various articles on the cord into discrete sections.

It should be observed that when each of the reinforced plastic composite article have been severed, they will each typically include the cord in the central portion thereof. However, the cord has effectively been bonded within the bulk molding compound and the strands which completely envelope the bulk molding compound have been rigidly secured thereto during the curing operation.

A type of conveyor 432 may be employed for delivering each of the severed reinforced plastic composite articles to a delivery table 434, also in the manner as illustrated in FIG. 2B.

Referring now to FIG. 21, it can be observed that when hammer handles, for example, are being produced in the apparatus of the invention, two hammer handles are formed end to end. Specifically, the tail ends of the two hammer handles are joined together. It is for this purpose that the traveling cut-off saw severs these various components into individual sections. By reference to FIG. 21, it can be observed that the strands 65 will become hardened about the bulk molding core of plug 112 and which is contained on this continuous cord 20. In this case, it can be observed that when severed, the cord will remain within the plug 112 but bonded thereto.

FIG. 22 illustrates a metal hammer head actually affixed to the reinforced plastic composite hammer handle with a cover sheath on the handle thereof.

Thus, there has been illustrated and described a unique and novel apparatus and method for producing reinforced plastic composite articles which may have a non-uniform shape along their length, and unique articles of this type and which, thereby, fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by Letters Patent is:

1. An apparatus for producing a fiber reinforced plastic article which may have a non-uniform shape over its length, said apparatus comprising:
   (a) means for providing a rope of a formable and curable material in a general shape and size so that it can be used in the production of a reinforced plastic article,
   (b) means for providing a continuous carrier string to receive and carry and move the formable and curable material,
   (c) means for separating the formable and curable material into a plurality of discrete sections while on said carrier string without severing the carrier string and where each discrete section becomes a plug which will remain in and become part of a final reinforced plastic article,
   (d) means for shaping each discrete section into a formable and curable material plug of a desired shape and which material used in the forming of said plug has a consistency to generally retain such shape, and which plug is carried by said string,
   (e) means for enclosing at least a portion of said plug in a fiber reinforced plastic layer impregnated with a curable binder to form a plug containing composite thereof,
   (f) means for wrapping said plug containing composite in a film generally adopting the shape of the layer surrounding at least said portion of said plug to form a film enclosed plug containing composite having a length and where the shape of and volume of material in said composite over its length is not necessarily uniform,
   (g) means to initiate a cure of said curable matrix and said plug of formable and curable material when said film enclosed composite is in the desired shape by simultaneously applying a curing energy to the curable binder and to the plug of material to simultaneously harden same and cause them to become bound together to form said reinforced plastic article, so that said article has a first portion with a larger cross-sectional shape than an adjacent second portion, and
   (h) means to separate said reinforced plastic article from said continuous carrier string and other reinforced plastic articles which may be formed on and carried by said string.

2. The apparatus of claim 1 further characterized in that said apparatus comprises a mold to receive the film enclosed composite during a period of time when the cure of said binder has been initiated and is progressing, and which mold imparts a final shape to at least a portion of said composite without substantial flow of said material but with movement of said layer or plug.

3. The apparatus of claim 2 further characterized in that said mold comprises a pair of split mold elements which are separated to receive said composites and are shifted together to form said mold and impart a final shape to a portion of said film enclosed composite.

4. The apparatus of claim 3 further characterized in that said mold causes a forming of the layer into a desired shape without causing a substantial distortion of material in said composite.

5. The apparatus of claim 1 further characterized in that said film is a shrinkable film and said apparatus comprises means for receiving said film enclosed composite layer and plug to shrink said film about the layer on said plug.

6. The apparatus of claim 5 further characterized in that said apparatus comprises means to remove said film after the binder has been substantially cured.

7. The apparatus of claim 1 further characterized in that the means for enclosing at least a portion of said plug applies a plurality of fiber reinforced plastic strands to generally fully surround said plug.

8. The apparatus of claim 1 further characterized in that a plurality of plugs are formed on the continuous string, said means for enclosing applies said impregnated layer to each plug as it passes the means for enclosing, said means for wrapping wraps each of said successive plugs and layers, and the means to initiate a cure initiates a cure of the binder in each successive composite.

9. The apparatus of claim 1 further characterized in that the means for separating comprises a pair of notched cutting blades with the notches located to be rotated with the blades permitting the blades to cut the formable and curable material and the notch prevents cutting of the carrier string.

10. The apparatus of claim 9 further characterized in that means is provided for initially forming the rope into somewhat of an inverted U-shape to be draped over the continuous string.

11. The apparatus of claim 10 further characterized in that the means for initially forming comprises a roller with a peripheral recess and a mating roller with a generally blunt peripheral edge causing the rope of formable and curable material to be moved into the peripheral recess and formed by the generally blunt peripheral edge.

12. The apparatus of claim 1 further characterized in that the means for shaping comprises a plug shaping mold which is adapted to receive each plug prior to the wrapping in a film and which plug shaping mold provides a somewhat general shape to the plug with approximate dimensions of that in the final reinforced plastic object.

13. The apparatus of claim 12 further characterized in that said plug shaping mold is mounted on a traveling carriage which moves with and in coordinated timed relationship with the continuous string and plugs located thereon.

14. An apparatus for producing a fiber reinforced plastic article which may have a non-uniform shape and non-uniform cross-sectional volume over its length, said apparatus comprising:
 (a) means for providing a rope of a formable and curable material in a general shape and size so that it can be used in the production of a reinforced plastic article,
 (b) means for providing a continuous carrier string to receive and carry and move the formable and curable material,
 (c) means for separating the formable and curable material into a plurality of discrete sections while on said carrier string without severing the carrier string and where each discrete section becomes a plug which will remain in and become part of a final reinforced plastic article,
 (d) means for forming each discrete section of the formable and curable material into a plug of desired shape and which material forming said plug has a consistency to generally retain said shape,
 (e) means for enclosing at least a portion of each of said plugs in a reinforcing filament layer impregnated with a curable binder to form a layer enclosed plug containing composite,
 (f) means to initiate a cure of said curable binder and a hardening of said plug when said layer and plug are in the desired shape but without fully curing the binder or the plug, such that the composite has a desired length and shape and where the shape and the cross-sectional volume of said composite over said length is not necessarily uniform,
 (g) a mold to receive the composite during a period of time when the cure of said binder and the plug have been initiated and is progressing but not yet completed, and which mold imparts a final shape to at least said fiber reinforced plastic layer of said composite without substantial flow of said material to form said reinforced plastic article,
 (h) means associated with said mold to apply a final curing radiation to said binder and said plug while in said mold to advance the cure of the binder and plug to a hardened condition and to thereby cause the binder and the plug to become permanently bonded together, thereby providing a hardened reinforced plastic article, so that said article has a first portion of cross-sectional shape of larger volume than a second adjacent portion, and
 (i) means to separate said reinforced plastic article from said continuous carrier string and other reinforced plastic articles which may be formed on and carried by said string.

15. The apparatus of claim 14 further characterized in that said mold comprises a pair of split mold elements which are separated to receive said composite and are shifted together to form said mold and impart a final shape to at least a portion of said composite.

16. The apparatus of claim 15 further characterized in that said mold causes a forming of the layer into a desired shape without causing a substantial distortion of material in said composite.

17. The apparatus of claim 14 further characterized in that said apparatus comprises means for wrapping said plug and layer in a film generally adopting a shape of the layer surrounding at least said portion of said plug, and which means for wrapping is located in advance of the means to initiate a cure.

18. The apparatus of claim 17 further characterized in that said film is a shrinkable film and said apparatus comprises means for receiving said film enclosed layer and plug to shrink said film about the layer on said plug.

19. The apparatus of claim 12 further characterized in that a plurality of plugs are formed on the continuous string, said means for enclosing applies said impregnated layer to each plug as it passes the means for enclosing, said means for wrapping wraps each of said successive plugs and layers, and the means to initiate a cure initiates a cure of the binder in each successive composite.

20. The apparatus of claim 14 further characterized in that the means for separating comprises a pair of notched cutting blades with the notches located to be rotated with the blades permitting the blades to cut the formable and curable material and the notch prevents cutting of the carrier string.

21. The apparatus of claim 20 further characterized in that means is provided for initially forming the rope into somewhat of an inverted U-shape to be draped over the continuous string.

22. The apparatus of claim 21 further characterized in that the means for initially forming comprises a roller with a peripheral recess and a mating roller with a generally blunt peripheral edge causing the rope of formable and curable material to be moved into the peripheral recess and formed by the generally blunt peripheral edge.

23. The apparatus of claim 14 further characterized in that the means for shaping comprises a plug shaping mold which is adapted to receive each plug prior to the wrapping in a film and which plug shaping mold provides a somewhat general shape to the plug with approximate dimensions of that in the final reinforced plastic article.

24. The apparatus of claim 23 further characterized in that said plug shaping mold is mounted on a traveling carriage which moves with and in coordinated timed relationship with the continuous string and plugs located thereon.

25. An apparatus for producing a fiber reinforced plastic article which may have a non-uniform shape and non-uniform volume over its length, said apparatus comprising:
(a) means for providing a rope of a formable and curable material in a general shape and size so that it can be used in the production of a reinforced plastic article,
(b) means for providing a continuous carrier string to receive and carry and move the formable and curable material,
(c) means for separating the formable and curable material into a plurality of discrete sections while on said carrier string without severing the carrier string and where each discrete section becomes a plug which will remain in and become part of a final reinforced plastic article,
(d) a traveling carriage moveable with the string containing the discrete sections thereon and generally at the same rate of speed as the string and discrete sections,
(e) a pre-mold carried by said carriage and having a pair of split pre-mold elements adapted to open and close and on certain on such opening and closing movements to temporarily contain and to apply a pre-shape to each of the discrete sections on the string to thereby form a plug, and which plug is formed of a material having a consistency to generally retain such shape,
(f) means for enclosing at least a portion of said plug in a fiber reinforced plastic layer impregnated with a curable binder to form a plug containing composite thereof,
(g) means for wrapping said plug containing composite in a film generally adopting the shape of the layer surrounding at least said portion of said plug to form a film enclosed plug containing composite having a length, and where the shape of and volume of material in said composite over its length is not necessarily uniform,
(h) a final mold to receive the pre-shaped layer enclosed plug containing composites and having a pair of final split mold elements adapted to temporarily capture each film enclosed composite therebetween and apply a final shape thereto,
(i) means operatively associated with said apparatus for curing the curable binder and hardening the plug by simultaneously applying a curing energy to the binder and plug to simultaneously harden same and cause them to become bonded together to form a rigid reinforced plastic composite article, so that said article has a first portion with a larger cross-sectional volume and different cross-sectional shape than an adjacent second portion, and
(j) means to separate said reinforced plastic article from said continuous carrier string and other reinforced plastic articles which may be formed on and carried by said string.

26. The apparatus of claim 25 futher characterized in that the means for curing is associated with said final mold so that the final curing takes place simultaneously with the final shaping of the reinforced plastic article.

27. The apparatus of claim 26 further characterized in that a precuring means is operatively associated with said apparatus to initiate a cure of the plug of formable and curable material and of the curable binder.

28. The apparatus of claim 25 further characterized in that the means for separating comprises a pair of notched cutting blades with the notches located to be rotated with the blades permitting the blades to cut the formable and curable material and the notch prevents cutting of the carrier string.

29. The apparatus of claim 28 further characterized in that means is provided for initially forming the rope somewhat of an inverted U-shape to be draped over the continuous string.

30. The apparatus of claim 29 further characterized in that the means for initially forming comprises a roller with a peripheral recess and a mating roller with a generally blunt peripheral edge causing the rope of formable and curable material to be moved into the peripheral recess and formed by the generally blunt peripheral edge.

31. The apparatus of claim 26 further characterized in that said final mold comprises a pair of split mold elements which are separated to receive said composites and are shifted together to form said mold and impart a final shape to a portion of said film enclosed composite.

32. An apparatus for producing a fiber reinforced plastic article which may have a non-uniform shape and non-uniform volume over its length, said apparatus comprising:
(a) means for providing a rope of a formable and curable material in a general shape and size so that it can be used in the production of a reinforced plastic article,
(b) means for providing a continuous carrier string to receive and carry and move the formable and curable material,
(c) means for separating the formable and curable material into a plurality of discrete sections while on said carrier string without severing the carrier string and where each discrete section becomes a plug which will remain in and become part of a final reinforced plastic article,
(d) a traveling carriage moveable with the string containing the discrete sections thereon and generally at the same rate of speed,
(e) a pre-mold carried by said carriage and having a pair of split pre-mold elements adapted to open and close and on certain of such opening and closing movements to temporarily contain and apply a pre-shape to each of the discrete sections on the string to thereby form a plug, and which plug is formed of a material having a consistency to generally retain such shape,
(f) means for enclosing at least a portion of said plug in a fiber reinforced plastic layer impregnated with a curable binder to form a plug containing composite thereof,
(g) means to initiate a cure of said curable binder and said formable and curable material when said film enclosed composite is in the desired shape to form said reinforced plastic article,
(h) a final mold to receive the pre-shaped layer enclosed plug containing composites and having a pair of final split mold elements adapted to temporarily capture each film enclosed composite therebetween and apply a final shape thereto, and (i) means operatively associated with said apparatus for curing the curable binder and hardening the plug by simultaneously applying a curing energy to the binder and plug to simultaneously harden same and cause them to become bonded together to form a rigid reinforced plastic composite article simultaneously with finally foming the article in the final mold, so that said article has a first portion with a different cross-sectional volume and a different cross-sectional shape than an adjacent second portion.

33. The apparatus of claim 32 further characterized in that said apparatus comprises means to separate said reinforced plastic article from said continuous carrier string and other reinforced plastic articles which may be formed on and carried by said string.

34. The apparatus of claim 32 further characterized in that said appratus comprises means for wrapping said plug containing composite in a film generally adopting the shape of the layer surrounding at least said portion of said plug to form a film enclosed plug containing composite having a length, and which means for wrapping takes place before the precuring.

35. The apparatus of claim 32 further characterized in that the means for separating comprises a pair of notched cutting blades with the notches located to be rotated with the blades permitting the blades to cut the formable and curable material and the notch prevents cutting of the carrier string.

36. The apparatus of claim 35 further characterized in that means is provided for initially forming the rope into somewhat of an inverted U-shape to be draped over the continuous carrier string.

37. The apparatus of claim 36 further characterized in that the means for initially forming comprises a roller with a peripheral recess and a mating roller with a generally blunt peripheral edge causing the rope of formable and curable material to be moved into the peripheral recess and formed by the generally blunt peripheral edge.

38. An apparatus for producing a fiber reinforced plastic article having a non-uniform shape and a non-uniform volume over its length, said apparatus comprising:
  (a) means for providing a plug of a formable and curable material with a desired shape,
  (b) means for forming said plug of curable and formable material into a desired shape so that a portion of the final article will have its shape at least partially imparted by said plug,
  (c) means providing a source of resin matrix impregnated fiber reinforced strands,
  (d) means for enclosing at least a portion of said plug with said strands to form a composite thereof and where at least some of said strands extend beyond said plug, and
  (e) means for providing a final shape to and curing the matrix in said strands and hardening the plug by simultaneously hardening the plug and the matrix and strands and cause them to become bonded together, to form an article which has one part with a shape imparted by the plug and strands enclosing the plug and another part with a shape imparted substantially only by the strands.

39. The apparatus of claim 38 further characterized in that said apparatus comprises:
  (a) means for providing a rope of a formable and curable material in a general shape and size so that it can be used in the production of a reinforced plastic article,
  (b) means for providing a continuous carrier string to receive and carry and move the formable and curable material, and
  (c) means for separating the formable and curable material into a plurality of discrete sections while on said carrier string without severing the carrier string and where each discrete section becomes a plug in the final article when formed.

40. The apparatus of claim 39 further characterized in that said apparatus comprises means to separate said reinforced plastic article from said continuous carrier string and other reinforced plastic articles which may be formed on and carried by said string.

41. The apparatus of claim 38 further characterized in that means is provided for wrapping and enclosing the strand enclosed composite in a shrinkable film prior to the means for providing a final shape to and curing.

42. The apparatus of claim 41 further characterized in that the means for providing a final shape comprises a mold to receive the film enclosed composite during a period of time when the cure of said matrix has been initiated and is progressing, and which mold imparts a final shape to at least a portion of said composite without substantial flow of said material but with movement of said layer or plug.

43. The apparatus of claim 42 further characterized in that said mold comprises a pair of split mold elements which are separated to receive said composites and are shifted together to form said mold and impart a final shape to a portion of said film enclosed composite.

44. The apparatus of claim 43 further characterized in that said film is a shrinkable film and said apparatus comprises means for receiving each said film enclosed composite layer and plug to shrink said film about the layer on said plug.

45. The apparatus of claim 44 further characterized in that said apparatus comprises means to remove said film after the matrix has been substantially cured.

46. A method for producing a fiber reinforced plastic article which may have a non-uniform shape and non-uniform volume over its length, said method comprising:
  (a) providing a rope of a formable and curable material in a general shape and size so that it can be used in the production of a reinforced plastic article,
  (b) providing a continuous carrier string to receive and carry and move the formable and curable material,
  (c) separating the formable and curable material into a plurality of discrete sections while on said carrier string without severing the carrier string and where each discrete section becomes a plug which will remain in and become part of a final reinforced plastic article,
  (d) forming each of the discrete sections into a plug of a desired shape and which material forming said plug has a consistency to generally retain such shape and which plug is carried by said string,
  (e) enclosing at least a portion of said plug in a fiber reinforcement layer impregnated with a curable binder to form a plug containing composite thereof,
  (f) wrapping said plug containing composites in a film generally adopting the shape of the layer surrounding at least said portion of each said plug to form a film enclosed plug containing composite having a length and where the shape of and volume of material in each said film enclosed composite over said length is not necessarily uniform, (g) initiating a cure of said curable binder and said plugs of formable and curable material by simultaneously applying a curing energy to the binder and the plugs to simultaneously harden same and cause them to become bonded together when said film enclosed composite is in the desired shape, to thereby form a reinforced plastic article with a first portion having a different cross-sectional shape and cross-sectional volume than an adjacent second portion, and (h) separating said reinforced plastic article from said continuous carrier string and other reinforced plastic articles which may be formed on and carried by said string.

47. The method of claim 46 further characterized in that said method comprises imparting a final shape to at least a portion of said composite without substantial flow of said material or movement of said layer in a mold which receives the composite during a period of time when the cure of said binder has already been initiated and is progressing, and simultaneously applying a curing radiation to finally cure such article.

48. The method of claim 47 further characterized in that said method comprises forming said layer to a desired shape about said plug without substantial distortion of material in said composite.

49. The method of claim 48 further characterized in that said film is a shrinkable film and said method comprises receiving said film enclosed composite layer and plug and shrinking said film about the layer on said plug.

50. The method of claim 49 further characterized in that said method comprises removing said film after the binder and plug of material have been substantially cured.

51. The method of claim 46 further characterized in that the step of enclosing at least a portion of said plug applies a plurality of fiber reinforcing strands to generally fully surround said plug.

52. The method of claim 46 further characterized in that a plurality of plugs are formed on the continuous string, said step for enclosing comprises applying said impregnated layer to each plug, said step for wrapping comprises wrapping each said successive plug and layer, and the step to initiate a cure comprises initiating a cure of the binder in each successive composite.

53. The apparatus of claim 46 further characterized in that said method comprises initially forming the rope into somewhat of an inverted U-shape to be draped over the continuous string.

54. An apparatus for producing a fiber reinforced plastic article which may have a non-uniform shape over its length, said apparatus comprising:
(a) means for providing a rope of a formable and curable material in a general shape and size so that it can be used in the production of a reinforced plastic article,
(b) means for providing a continuous carrier string to receive and carry and move the formable and curable material,
(c) means for separating the formable and curable material into a plurality of discrete sections while on said carrier string without severing the carrier string and where each discrete section becomes a plug which will remain in and become part of a final reinforced plastic article,
(d) means for shaping each discrete section into a formable and curable material plug of a desired shape and which material used in the forming of said plug has a consistency to generally retain such shape, and which plug is carried by said string,
(e) means for enclosing at least a portion of said plug in a fiber reinforcing layer impregnated with a curable binder to form a plug containing composite thereof and which composite has a length and where the shape of and volume of material in said composite over its length is not necessarily uniform, and
(f) means to initiate a cure of said curable matrix and said plug of formable and curable material when said film enclosed composite is in the desired shape by simultaneously applying a curing energy to the curable binder and to the plug of material to simulaneously harden same and cause them to become bound together to form said reinforced plastic article, so that said article has a first position with a larger cross-sectional shape than an adjacent second portion.

55. The apparatus of claim 54 further characterized in that said apparatus comprises means to separate said reinforced plastic article from said continuous carrier string and other reinforced plastic articles which may be formed on and carried by said string.

56. The apparatus of claim 55 further characterized in that said apparatus comprises a mold to receive the composite during a period of time when the cure of said binder has been initiated and is progressing, and which mold imparts a final shape to at least a portion of said composite without substantial flow of said material but with movement of said layer or plug.

57. The apparatus of claim 56 further characterized in that said mold comprises a pair of split mold elements which are separated to receive said composites and are shifted together to form said mold and impart a final shape to a portion of said film enclosed composite.

58. An apparatus for producing plugs of a formable and curable material to be used in fiber reinforced plastic articles and which plugs provide for a non-uniform shape and non-uniform cross-sectional volume over the article length, said apparatus comprising:
(a) means for providing a rope of a formable and curable material in a general shape and size so that it can be used in the production of a reinforced plastic article,
(b) means for providing a continuous carrier string to receive and carry and move the formable and curable material,
(c) means for depositing the rope of material on said continuous carrier string,
(d) means for separating the formable and curable material into a plurality of discrete sections while on said carrier string without severing the carrier string and where each discrete section is capable of being a plug and a part of a reinforced plastic article to be produced, said means for separating comprising a pair of notched cutting blades with the notches located to be rotated with the blades permitting the blades to cut the formable and curable material and the notch prevents cutting of the carrier string, and
(e) means for forming each discrete section of the formable and curable material into a plug of desired shape and which material forming said plug has a consistency to generally retain said shape.

59. The apparatus of claim 58 further characterized in that means is provided for initially forming the rope into somewhat of an inverted U-shape to be draped over the continuous string.

60. The apparatus of claim 59 further characterized in that the means for initially forming comprises a roller with a peripheral recess and a mating roller with a generally blunt peripheral edge causing the rope of formable and curable material to be moved into the peripheral recess and formed by the generally blunt peripheral edge.

61. The apparatus of claim 60 further characterized in that the means for shaping comprises a plug shaping mold which is adapted to receive each plug and which plug shaping mold provides a somewhat general shape to the plug with the approximate dimension of a final reinforced plastic article to be produced.

62. The apparatus of claim 61 further characterized in that said plug shaping mold is mounted on a traveling carriage which moves with and in coordinated timed relationship with the continuous string and plugs located thereon.

63. An apparatus for producing a fiber reinforced plastic article which may have a non-uniform shape and non-uniform volume over its length, said apparatus comprising:

(a) means for providing a plurality of individual spaced apart plugs of a formable and curable material on a carrier string and which have a general shape and size so that they can be used in the production of reinforced plastic articles, (b) a traveling carriage moveable with the string containing the plugs thereon and generally at the same rate of speed as the string and plugs, (c) a pre-mold carried by said carriage and having a pair of split pre-mold elements adapted to open and close and on certain of such opening and closing movements to temporarily contain and to apply a pre-shape to each of the plugs on the carrier string and which plugs are formed of a material having a consistency to generally retain such shape, (d) means for enclosing at least a portion of each of said plugs in a fiber reinforcing layer impregnated with a curable binder to form a plug containing composite thereof, (e) a final mold to receive the pre-shaped plug containing composites and having a pair of final split mold elements adapted to temporarily capture each composite therebetween and apply a final shape thereto, (f) means operatively associated with said apparatus for curing the curable binder and hardening the plugs by simultaneously applying a curing energy to the binder and plugs to simultaneously harden same and cause them to become bonded together to form rigid reinforced plastic composite articles, so that each said article has a first portion with a larger cross-sectional volume and different cross-sectional shape than an adjacent second portion, and (g) means to separate each said reinforced plastic article from said continuous carrier string and other reinforced plastic articles which may be formed on and carried by said string.

64. The apparatus of claim 63 further characterized in that the means for curing is associated with said final mold so that the final curing takes place simultaneously with the final shaping of the reinforced plastic article.

65. The apparatus of claim 64 further characterized in that said apparatus comprises means for wrapping said plug containing composites in a film generally adopting the shape of the layer surrounding at least said portion of said plug to form a film enclosed plug containing composite having a length, and where the shape of and volume of material in said composite over its length is not necessarily uniform.

66. The apparatus of claim 64 further characterized in that a precuring means is operatively associated with said apparatus to initiate a cure of the plug of formable and curable material and of the curable binder.

67. The apparatus of claim 66 further characterized in that said mold comprises a pair of split mold elements which are separated to receive said composites and are shifted together to form said mold and impart a final shape to a portion of said composites.

* * * * *